(12) United States Patent
Date et al.

(10) Patent No.: US 8,713,502 B1
(45) Date of Patent: Apr. 29, 2014

(54) METHODS AND SYSTEMS TO REDUCE A NUMBER OF SIMULATIONS IN A TIMING ANALYSIS

(71) Applicant: International Business Machines Corporation, Armonk, NY (US)

(72) Inventors: Nilesh C. Date, Bangalore (IN); Amol A. Joshi, Essex Junction, VT (US); David B. White, Essex Junction, VT (US); William J. Wright, Colchester, VT (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 13/776,892

(22) Filed: Feb. 26, 2013

(51) Int. Cl.
 *G06F 17/50* (2006.01)
(52) U.S. Cl.
 USPC .......................................... 716/113; 716/134
(58) Field of Classification Search
 None
 See application file for complete search history.

(56) References Cited

U.S. PATENT DOCUMENTS

| | | | |
|---|---|---|---|
| 6,629,289 B2 * | 9/2003 | Yamamoto et al. | 714/815 |
| 6,691,284 B2 * | 2/2004 | Kashyap | 716/101 |
| 6,877,139 B2 | 4/2005 | Daga | |
| 6,928,630 B2 | 8/2005 | Moon et al. | |
| 7,373,444 B2 | 5/2008 | Asano et al. | |
| 7,437,696 B2 * | 10/2008 | Koch et al. | 716/113 |
| 8,056,038 B2 | 11/2011 | Kalafala et al. | |
| 8,204,730 B2 | 6/2012 | Liu et al. | |
| 8,219,745 B2 | 7/2012 | Bellows et al. | |
| 8,250,283 B1 | 8/2012 | Lee et al. | |
| 8,261,221 B2 | 9/2012 | Singhal et al. | |
| 8,275,951 B2 | 9/2012 | Andruszkiewicz et al. | |
| 8,418,102 B2 * | 4/2013 | Brown | 716/108 |
| 2003/0204817 A1 * | 10/2003 | Kashyap | 716/1 |
| 2003/0225562 A1 | 12/2003 | Singh | |
| 2004/0215437 A1 * | 10/2004 | Sul | 703/19 |
| 2005/0149895 A1 | 7/2005 | Toubou | |
| 2006/0031808 A1 | 2/2006 | Toyoda | |
| 2011/0246717 A1 | 10/2011 | Kobayashi et al. | |
| 2011/0289256 A1 | 11/2011 | Barlett | |
| 2011/0302374 A1 | 12/2011 | Cantin et al. | |
| 2012/0084066 A1 | 4/2012 | Buck et al. | |
| 2012/0195192 A1 | 8/2012 | Matthews et al. | |
| 2012/0221313 A1 | 8/2012 | Patra | |
| 2012/0221922 A1 | 8/2012 | Bennett | |

(Continued)

OTHER PUBLICATIONS

Singhee, et al., "Practical, Fast Monte Carlo Statistical Static Timing Analysis: Why and How," IEEE/ACM International Conference, 2008, pp. 190-195.

(Continued)

*Primary Examiner* — Leigh Garbowski
(74) *Attorney, Agent, or Firm* — Gibb & Riley, LLC; Richard M. Kotulak, Esq.

(57) ABSTRACT

Methods and systems for determining timing constraint analysis of an integrated circuit (IC) may include defining a sequence of sample points for timing constraint analysis of an n×n matrix, each sample point corresponding to a timing arc of the IC that includes data and reference slews; initially simulating extreme sample points of the matrix, according to the sequence, by substituting timing constraints from liberty files of the IC type for time values of the data slews and conducting a binary search for optimized timing constraints; and interpolating other sample points, according to the sequence, each of the other sample points having a starting bisection point that results from linear interpolation of the timing constraint analysis from adjoining sample points, which were simulated.

20 Claims, 15 Drawing Sheets

(56) References Cited

U.S. PATENT DOCUMENTS

2012/0233406 A1 9/2012 Igashira et al.
2012/0245904 A1 9/2012 Abbaspour et al.
2012/0266119 A1 10/2012 Soreff et al.
2012/0278779 A1 11/2012 Omura et al.

OTHER PUBLICATIONS

Disclosed Anonymously, "Method for Providing Detailed Artificial Waveforms to Digital-Timing and Power Simulations for VLSI Circuit Characterization," IP.com No. IPCOM000216275D, Mar. 27, 2012, 5 pages.

Srivastava, et al., "Rapid and Accurate Latch Characterization via Direct Newton Solution of Setup/Hold Times," EDAA, 2007 pp. 1-6.

Srivastava, et al., "Independent and Interdependent Latch Setup/Hold Time Characterization via Newton-Raphson Solution and Euler Curve Tracking of State-Transition Equations," IEEE Transactions on Computer-Aided Design of Integrated Circuits and Systems, vol. 27, No. 5, May 2008, pp. 817-830.

Srivastava, et al., "Interdependent Latch Setup/Hold Time Characterization via Euler-Newton Curve Tracing on State-Transition Equations," 9.1, DAC 2007, ACM 978-1-59593-27-1/07-0006, Jun. 4-8, 2007, pp. 136-141.

Tarawneh, et al., "Modified Bisection Search for Faster Metastability Characterization," Technical Report Series, NCL-EECE-MSD-TR-2010-154, Jun. 2010, pp. 1-7.

Lee, et al., "Pulse Width Allocation and Clock Skew Scheduling: Optimizing Sequential Circuits Based on Pulsed Latches," IEEE Transactions on Computer-Aided Design of Integrated Circuits and Systems, vol. 29, No. 3, Mar. 2010, pp. 355-366.

\* cited by examiner

FIG. 1 – Related Art
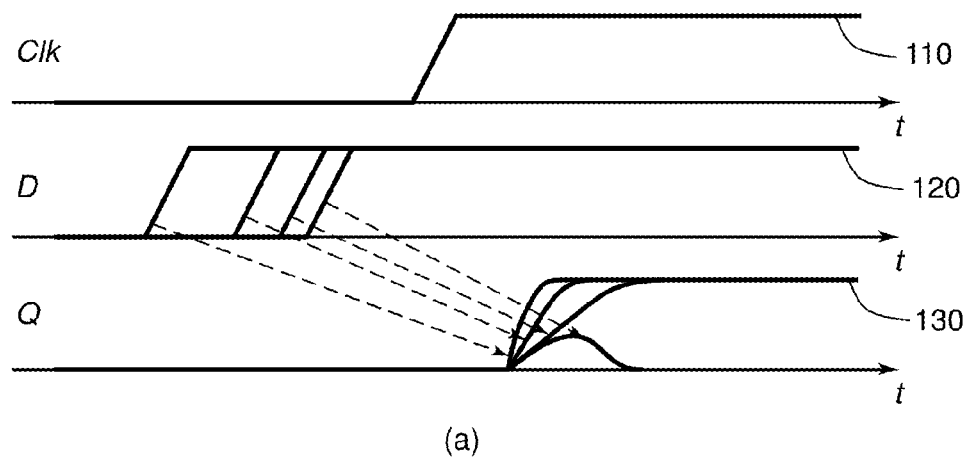
(a)
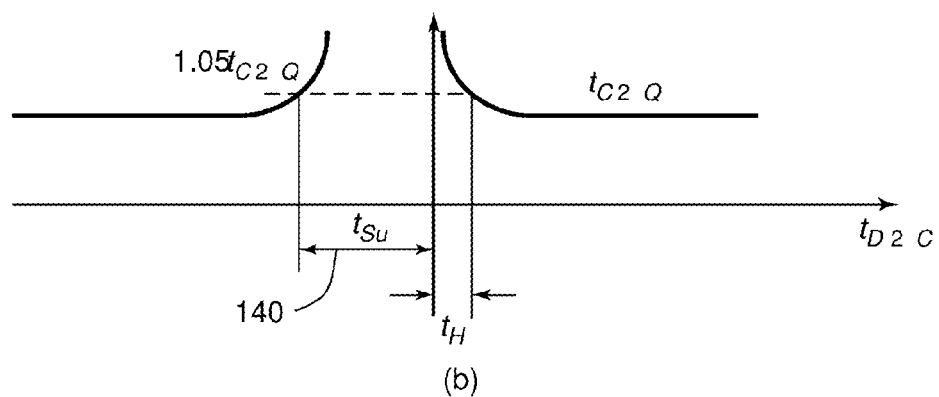
(b)
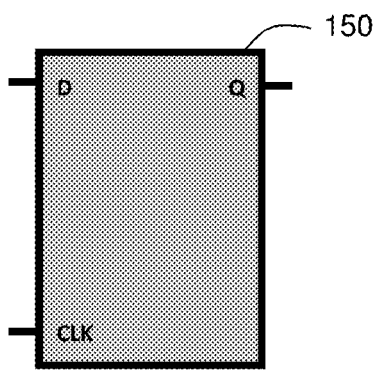
(c)

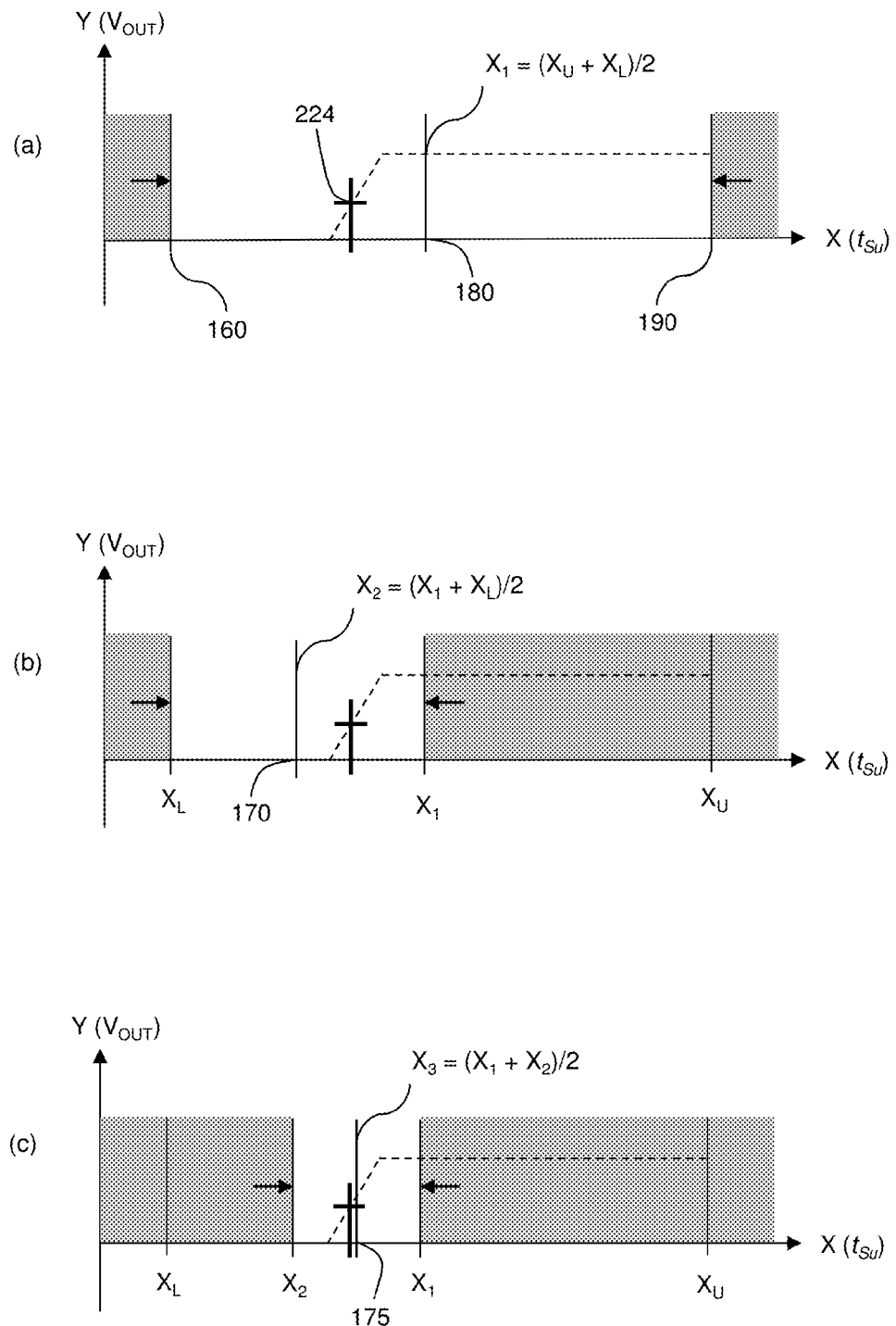
FIG. 2 – Related Art

US 8,713,502 B1

METHODS AND SYSTEMS TO REDUCE A NUMBER OF SIMULATIONS IN A TIMING ANALYSIS

BACKGROUND

The present disclosure relates to computer-implemented methods, computer program products and computer systems that reduce a number of circuit simulations for a timing analysis of a digital integrated circuit (IC), which comprises multiple cells. In particular, timing constraints from liberty files provide a range of input data slews and a range of output reference slews, which include pushout, for the timing arcs of the digital IC. More particularly, a sequence of analyses, each including an input data slew and an output reference slew, is organized as a matrix for the timing analysis of each timing arc of the digital IC.

During design, timing analysis constitutes a majority of the characterization of a digital integrated circuit (IC) comprising multiple cells. A timing analysis can include a setup time constraint ($t_{Su}$) or a hold time constraint ($t_H$) for each timing arc of the digital IC. FIGS. 1(a) and 1(b) illustrate a timing analysis of, for example, setup time constraints, $t_{Su}$ 140 for the cell 150 of FIG. 1(c). Clock, Clk(t) 110, and data, D(t) 120, signals drive the cell 150. The result is an output transition, Q(t) 130, where V(out) changes from low to high; typically, the time value of Q(t) 130 is measured at 50% of V(out). Timing constraint analysis generally "fixes" the clock signal, Clk(t) 110, while varying the input data signal, D(t) 120, to obtain the resultant output transition, Q(t) 130. The following relationship between the clock signal, Clk(t) 110, the data signal, D(t) 120, and the setup time, $t_{Su}$ 140, must be true for the output transition, Q(t) 130, to occur: Clk(t)>(D(t)+$t_{Su}$), i.e., the setup time, $t_{Su}$ 140, is the minimum amount of time by which the input data signal, D(t) 120, must precede the clock signal, Clk(t) 110, in order to cause the output transition, Q(t) 130.

FIG. 1(a) illustrates that relative to the fixed time value of the clock signal, a large setup time, $t_{Su}$, is associated with a data signal, D(t), having a small time value, i.e., to the left on the time axis, while a small setup time, $t_{Su}$, is associated with a data signal, D(t), having a large time value, i.e., to the right on the time axis. FIG. 1(a) also illustrates that smaller setup times, i.e., later data transitions, are associated with output transitions of Q(t), which are characterized by a greater time values at their 50% amplitudes, the so-called "pushout".

Characterization, or violation analysis, determines the setup time, $t_{Su}$ 140, of the cell. To determine the setup time, $t_{Su}$ 140, of the cell 150, a circuit simulator keeps the Clk(t) 110 waveform fixed, while repeating circuit simulations with the different D(t) 120 waveforms. The circuit simulator then observes which D(t) 120 waveforms produce an output transition, Q(t) 130, and which do not. A linear search method can be used that requires a tight sweep of delays between the data setup and the clock edge, which looks for a minimal setup time at which the output transition just occurs, and is accurate only if the sweep step is very small, which requires a very large number of steps.

To avoid the very large number of circuit simulations in a linear search method, a binary search is used to measure a timing constraint of a cell. A binary search is an optimization method that finds a target value of an input variable, e.g., a data setup time before the fixed clock or a data hold time after the fixed clock, which is associated with a goal value of an output variable, e.g., a V(out), for the cell indicating a transition from low to high. The input and output variables can be any of a voltage, a current, a setup time, a hold time, or a gain that are related by a transfer function associated with the circuit simulation.

A binary search is used to locate the target value of the input variable that just produces the output goal value within a search range of the input variable. The search range is iteratively halved or bisected to converge on the target value of the input variable. At each of the iterations, the timing analyzer of the circuit simulator compares the measured value of the output variable with the goal value. A bisection method involves both measurement and optimization steps when solving a timing violation problem: 1) detecting whether the measured goal value of the output variable has occurred, e.g., the V(out) for Q(t); and 2) optimizing a search range for the input parameter, e.g., data setup time, $t_{Su}$, to find the target value for which the measured goal value of the output transition just occurs.

Referring to FIG. 2(a), the bisection method requires a search window comprising an upper boundary $X_U$, 190 and a lower boundary $X_L$, 160 to be specified for the input variable, X. To begin the bisection method in the case of a data setup time, $t_{Su}$, a simulation of the upper boundary $X_U$, 190 must result in the output variable yielding a "pass", i.e., Y ($V_{OUT}$) of Q(t) being equal to or greater than (or to the right of) the output variable's goal value, 175, which is associated with the desired target value; while a simulation of the lower boundary $X_L$, 160 must result in the output variable yielding a "fail", i.e., Y ($V_{OUT}$) of Q(t) being less than (or to the left of) the goal value, 175. Having simulated a sequential "pass" and "fail", the bisection method then simulates an input variable located halfway between the upper boundary $X_U$, 190 and the lower boundary $X_L$, 160, i.e., the first bisection point $X_1$, 180, which equals ($X_U+X_L$)/2. If the simulation of the first bisection point $X_1$ passes, then the target value of the input variable X must be less than that of the first bisection point $X_1$. As indicated in FIG. 2(b), the bisection method then moves the upper boundary, $X_U$, of the input variable to the first bisection point $X_1$, which passed the simulation, as the new upper boundary of a new search window. If the simulation of the first bisection point $X_1$ were to fail, then the target value of the input variable X must have been greater than that of the first bisection point $X_1$, and the method would then have moved the lower boundary to the first bisection point $X_1$, as the new lower boundary.

Referring to FIG. 2(b), after establishing a new upper boundary at the first bisection point $X_1$, the bisection method then iteratively simulates the input variable located midway between new upper boundary at the first bisection point, $X_1$, and the lower boundary, $X_L$, i.e., the second bisection point $X_2$, 170, which equals ($X_1+X_L$)/2. If, as is the case in FIG. 2(b), the simulation of the second bisection point $X_2$ fails, then the target value of the input variable X must be greater than that of the second bisection point, $X_2$. As indicated in FIG. 2(c), the bisection method then moves the lower boundary, $X_L$, to the second bisection point, $X_2$, which failed the simulation, as the new lower boundary for the next search window. The method will then iteratively simulate the input variable located midway between the new upper boundary at the first bisection point, $X_1$, and the new lower boundary at the second bisection point, $X_2$, at the third bisection point, $X_3$, which equals ($X_1+X_2$)/2.

The binary search continues in the manner described above, moving either the upper boundary or the lower boundary to the last simulated bisection point, and iteratively simulating a new bisection point between new boundaries to form new search windows. The iterations of the bisection method stop, when a difference between the last simulated value of the last bisection point and the newly simulated value of the new bisection point is less than or equal to a specified error tolerance. A conventional binary method can require several tens of iterations to converge, making the cost of simulation high.

A conventional characterization of a digital IC includes not only a range of input data timing variables applied to each cell and a fixed output transition to determine, for example, a setup time, $t_{Su}$, but also data related to each voltage threshold of each cell type, each process variation, each set of operating conditions for each cell, and each timing arc.

Conventional characterization of the output transition, using a binary search, does not take into account, the various time values of the "pushout" of output transitions, which vary not only with smaller setup time values but also with cell type. Thus, the conventional timing tools are forced to extrapolate timing values for the desired data/reference signal slew ranges, which negatively affects accuracy, adds pessimism, and affects yields.

There remains a need to analyze a timing constraint of a digital IC that takes advantage of the efficiencies of a binary search and provides an accurate timing analysis for each of the timing arcs, which are characterized by various time values of the "pushout" of output transitions.

SUMMARY

In view of the foregoing, the discloser may provide a computer-implemented method for determining timing constraint analyses of an integrated circuit (IC). The method may include defining a sequence of sample points for timing constraint analyses in an n×n matrix, each sample point corresponding to a timing arc of the IC that includes a data slew and a reference slew, which is to be analyzed by one of: simulation and interpolation. The method may also include initially simulating corner sample points of the matrix, according to the sequence, by substituting minimum and maximum timing constraints from liberty files of the IC type, for time values of the data slews, establishing a step size based on the minimum and maximum timing constraints for a starting bisection point of a binary search, and conducting the binary search from the starting bisection point and using a result from the binary search to simulate the timing constraint analyses for each of the corner sample points. The method may further include interpolating other sample points, according to the sequence, each of the other sample points having a starting bisection point that results from linear interpolation of the timing constraint analyses from adjoining sample points, which were simulated.

The discloser may provide another computer-implemented method for determining timing constraint analyses of an integrated circuit (IC). The method may include defining, by a computer, sample points for timing constraint analyses in an n×n matrix, each sample point corresponding to a timing arc of the IC that includes a data slew and a reference slew. The method may also include initially simulating sample points corresponding to (DSmax, RSmin) and (DSmin, RSmax) of the matrix by substituting minimum and maximum timing constraints from liberty files of the IC type, for time values of the data slews, establishing a step size based on the minimum and maximum timing constraints for a starting bisection point of a binary search, and conducting the binary search from the starting bisection point and using a result from the binary search to simulate the timing constraint analyses for each of the simulated sample points. The method may further include subsequently simulating, from (DS1, RS1) through each adjoining sample point to (DS7, RS1) and through each adjoining sample point to (DS1, RS7), an upper bound and a lower bound separated by an average step size of a timing constraint analysis to the left and a timing constraint analysis to the right. The method may yet further include subsequently computing a computed time value (TC) for any of those sample points other than those that have been simulated, where TC_(DSn, RSn) may equal T_(DS0, RSn)+T_(DSn, RS0)−T_(DS0, RS0), as a starting bisection point for determining said result from said binary search. Finally, the method may include validating each computed time value (TC).

The disclose may provide tangible computer program product readable by computer, tangibly embodying a program of instructions executable by the computer to perform a method for determining timing constraint analyses of an integrated circuit (IC). The method may include defining a sequence of sample points for timing constraint analyses in an n×n matrix, each sample point corresponding to a timing arc of the IC that includes a data slew and a reference slew, which is to be analyzed by one of: simulation and interpolation. The method may also include initially simulating corner sample points of the matrix, according to the sequence, by substituting minimum and maximum timing constraints from liberty files of the IC type, for time values of the data slews, establishing a step size based on the minimum and maximum timing constraints for a starting bisection point of a binary search, and conducting the binary search from the starting bisection point and using a result from said binary search to simulate the timing constraint analyses for each of the corner sample points. The method may further include interpolating other sample points, according to the sequence, each of the other sample points having a starting bisection point that results from linear interpolation of the timing constraint analyses from adjoining sample points, which were simulated.

BRIEF DESCRIPTION OF THE DRAWINGS

The exemplary methods and products of the disclosures herein will be better understood from the following detailed description with reference to the drawings, which are not necessarily drawn to scale and in which:

FIG. 1(a) is a schematic diagram illustrating clock, Clk(t), and data, D(t), signals that drive a cell of the digital integrated circuit (IC) in the related art;

FIG. 1(b) is a schematic diagram illustrating the timing constraints of setup time, $t_{Su}$, and hold time, $t_H$ for the cell of the digital IC in the related art;

FIG. 1(c) is a schematic diagram illustrating the inputs and out of a cell of the digital IC in the related art;

FIG. 2(a) is a schematic diagram illustrating a search window of a binary search comprising an upper boundary $X_U$ and a lower boundary $X_L$ to be specified for the input variable, X, in the related art;

FIG. 2(b) is a schematic diagram illustrating the bisection method that iteratively simulates the input variable located midway between new upper boundary, $X_1$, and the lower boundary, $X_L$, i.e., the second bisection point, $X_2$, which equals $(X_1+X_L)/2$, in the related art;

FIG. 2(c) is a schematic diagram illustrating the bisection method, which then moves the lower boundary, $X_L$, to the second bisection point, $X_2$, which failed the simulation, as the new lower boundary for the next search window in the related art;

DETAILED DESCRIPTION

Figure 3:
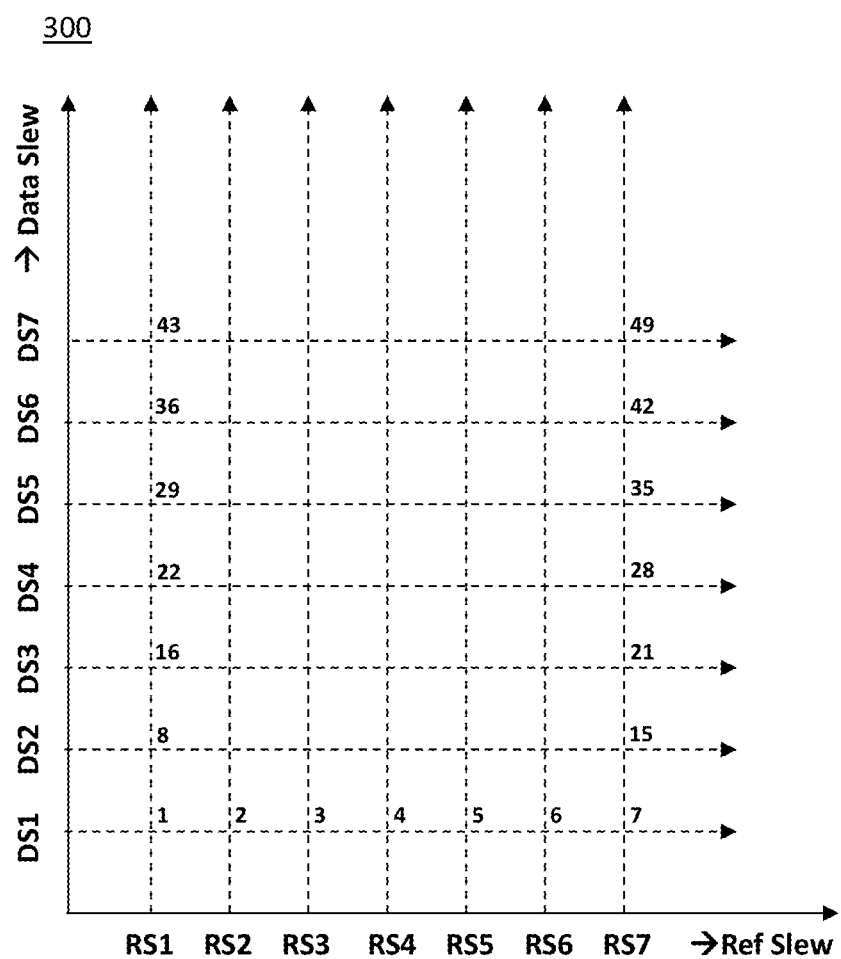
FIG. 3 is a schematic diagram illustrating a sample space, defined by a matrix, that includes for each sample point, a combination of an input data slew and an output reference slew, (DSnRSn), in one method.

The exemplary methods and products of the disclosure and their various features and advantageous details are explained more fully with reference to the non-limiting exemplary methods and products that are illustrated in the accompanying drawings and detailed in the following description. It should be noted that the features illustrated in the drawings are not necessarily drawn to scale. Descriptions of well-known materials, components, and processing techniques are omitted so as to not unnecessarily obscure the exemplary methods and products of the disclosure. The examples used herein are intended to merely facilitate an understanding of ways in which the exemplary methods and products of the disclosure may be practiced and to further enable those of skill in the art to practice the exemplary methods and products of the disclosure. Accordingly, the examples should not be construed as limiting the scope of the exemplary methods and products of the disclosure.

As described above, there remains a need to analyze a timing constraint of a digital IC that takes advantage of the efficiencies of a binary search and provides an accurate timing analysis for each of the timing arcs, which are characterized by various time values of the "pushout" of output transitions.

Presently, a timing constraint analysis for a digital IC that takes into account the various time values of the "pushout" of output transitions of each timing arc can create a sample space, defined by matrix 300, that includes for each sample point a combination of an input data slew and an output reference slew, (DSnRSn), as illustrated in FIG. 3. To provide, for example, a setup time Tsetup_(DSn, RSn) for each sample point, an independent simulation using a result from a binary search, employing the same upper and lower boundaries, can be performed on each combination of data slew and reference slew in the matrix. The independent simulations can be conducted in any order; for example, FIG. 3 illustrates that the order of simulations can proceed from left to right for the lowest row of combinations, i.e., (DS1, RS1) through (DS1, RS7), and from left to right for each sequentially higher row. In the exemplary case of FIG. 3, forty-nine independent simulations are performed on the forty-nine combinations of data slews and reference slews of the sample points.

In a method of the disclosure, a sequence of sample point analyses, corresponding to the timing arcs of a digital IC, may be defined for the all of the sample points of a matrix, in which some sample points are to be initially simulated with a result from a binary search, while subsequently analyzed sample points may be one of: simulated and interpolated. Those sample points that are to be initially simulated may be characterized by empirical data, which is stored in liberty files. Typically, a minimum timing constraint, e.g., a minimum setup time, from the liberty files may be substituted for a first corner sample point of the matrix, corresponding to a combination of a maximum time value of data slew and a minimum time value of reference slew, i.e., (DSmax, RSmin), and a maximum timing constraint, e.g., a maximum setup time, from the liberty files may be substituted for a second corner sample point of the matrix, corresponding to a combination of a minimum time value of data slew and a maximum time value of reference slew, i.e., (DSmin, RSmax).

Figure 4:
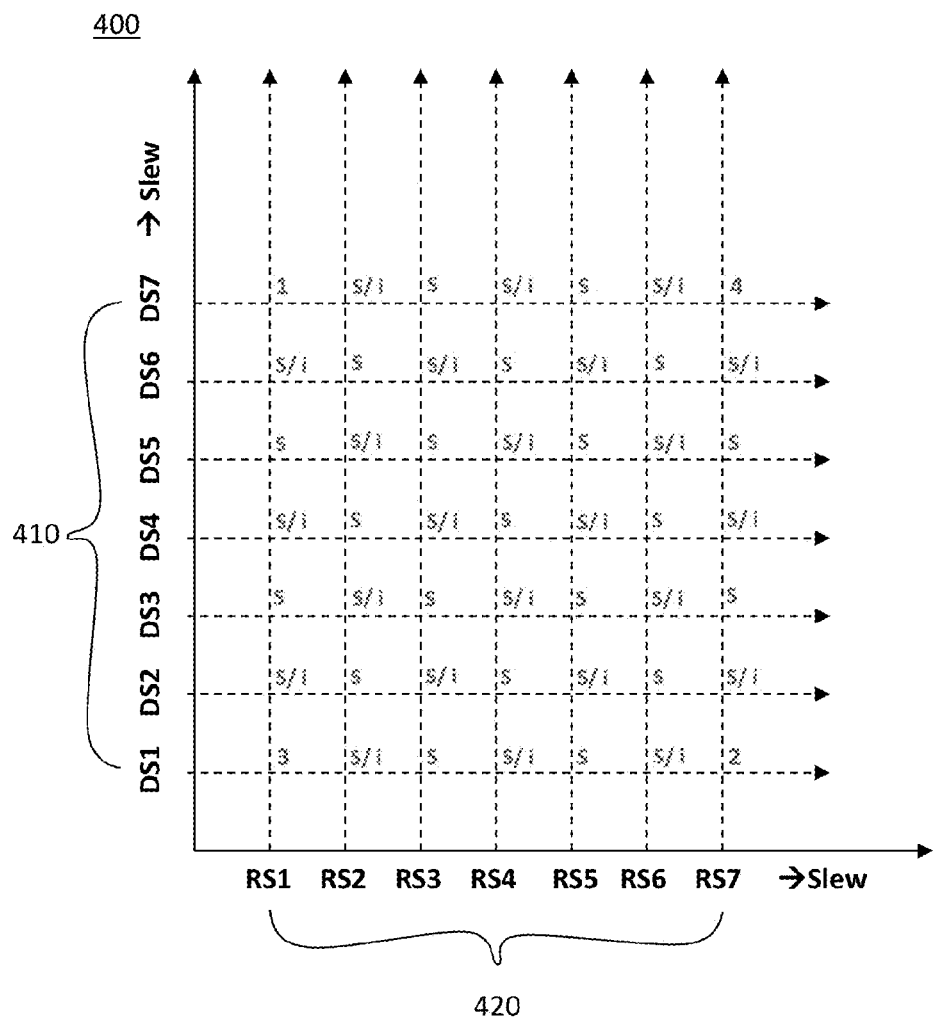
FIG. 4 is a schematic diagram illustrating an ordered sequence of sample point analyses that may be defined across a matrix, where natural numbers define an initial sequence of simulations for the sample points, "s" designates sample points that are to be subsequently simulated, and "s/i" designates sample points that are to be one of: subsequently simulated and subsequently interpolated in a method.

Referring to FIG. 4, an exemplary sequence of sample point timing analyses may be defined across the matrix 400, where natural numbers define an initial sequence of simulations for the sample points, "s" designates sample points that are to be subsequently simulated, and "s/i" designates sample points that are to be one of: subsequently simulated and subsequently interpolated. The matrix 400 may characterized by a range of time values for the data slews 410 and a range of time values for the reference slews 420 of the sample points. All possible combinations of the time values of the data slews and the time values of the reference slews may constitute the sample space.

Initial timing simulations for the exemplary sequence of sample point analyses may begin with the corner sample points 1 and 2, i.e., (DS7, RS1) and (DS1, RS7), to determine minimum and maximum timing constraint measurements, respectively, of all of the sample points. For example, the minimum setup time for the matrix may typically be defined by the maximum time value of an input data slew, stored in the liberty files, and the minimum time value of an output reference slew, also stored in the liberty files, i.e., (DS7, RS1), while the maximum setup time for the matrix may be defined by the minimum time value of an input data slew, stored in the liberty files, and the maximum time value of an output reference slew, also stored in the liberty files, i.e., (DS1, RS7).

Figure 5:
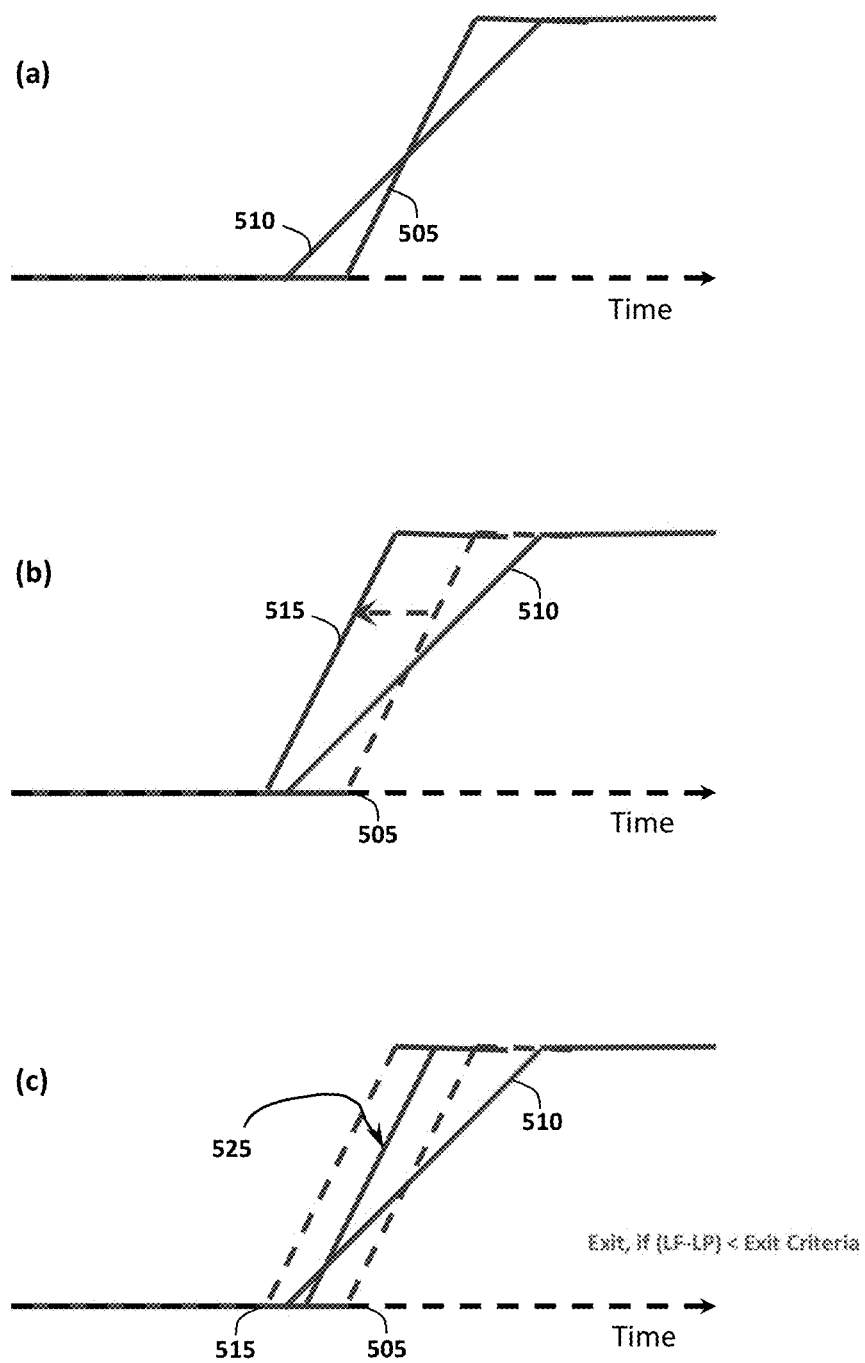
FIG. 5(a) is a schematic diagram illustrating that the corner sample point 1, having the time value of the data slew, (DS7), may be "snapped" to the time value of the reference slew, (RS1), at their 50% points of amplitude in the method.
FIG. 5(b) is a schematic diagram illustrating that upon this last simulation failing, i.e., a LF=Last Fail 505, the time value of the data slew, (DS7) 515, may be moved to the left in the method.
FIG. 5(c) is a schematic diagram illustrating that the amount of time by which to move the data slew to assure a pass, i.e., a LP=Last Pass, may establish a first bisection point 525 halfway between the LF and the LP positions, i.e., (LF−LP)/2, in the method.

As illustrated in FIG. 5(a), for corner sample point 1, the time value of the data slew, (DS7) 505, may be "snapped" to the time value of the reference slew, (RS1) 510, at their 50% points of amplitude, and a timing simulation may then be performed. In the case of a setup time simulation, the maximum time value of the data slew, (DS7) 505, may be to the right of (greater than) the time value of the minimum reference slew, (RS1) 510, and the simulation fails, i.e., Clk(t) is not >(D(t)+$t_{Su}$). Upon this last failing, i.e., a LF=Last Fail 505, the time value of the data slew, (DS7) 515, may be moved to the left, as shown in FIG. 5(b).

After the Last Fail 505, the time value of the data slew, (DS7) 515, may need to move left by an amount of time that assures a pass in a subsequent timing simulation in order to locate a new bisection point. In this case, the subsequent timing simulation may select among various amounts of time in a descending order: (1) a very conservative move to the left by the maximum time value of data slew, (DS7); (2) an optimistic move to the left by the average value of the data slews, Avg(Max(Data Slew), Min(Data Slew))=Avg((DS7), (DS1)); and (3) a pessimistic move to the left by the minimum time value of data slew, (DS1). Referring to FIG. 5(c), having selected the amount of time by which to move the data slew to assure a pass, i.e., a LP=Last Pass 515, a first bisection point 525 may be established halfway between the LF 505 and the LP 515 positions, i.e., (LF−LP)/2, which becomes the boundary for a subsequent binary search.

A timing simulation, employing a binary search, continues in the manner described above, moving either the upper boundary or the lower boundary to the last simulated bisection point, and iteratively simulating a new bisection point between new boundaries to form a new search window, when a Last Pass follows a Last Fail or alternatively, a Last Fail follows a Last Pass. The iterations of the bisection method may stop and may provide the timing constraint measurement, e.g., the setup time for corner sample point 1, when the difference between the last simulated value of the last bisection point and the newly simulated value of the new bisection point is less than an exit criterion of a specified error tolerance.

Similarly, for corner sample point 2, the time value of the data slew, (DS1), may be snapped to the time value of the reference slew, (RS7), at their 50% points of amplitude, and a timing simulation may then be performed. In the case of a setup time simulation, the minimum time value of the data slew, (DS1), may be to the left of (less than) the time value of the maximum reference slew, (RS7), and the simulation passes, i.e., LP=Last Pass. After the Last Pass, the time value of the data slew, (DS1), may need to move to the right by one or more amounts of time to assure a fail in a subsequent simulation in order to locate a new bisection point. In this case, the subsequent simulation may also select among various amounts of time in a descending order: (1) a very conservative move to the right by the maximum time value of data slew, (DS7); (2) an optimistic move to the right by the average value of the data slews, Avg(Min(Data Slew), Max(Data Slew))=Avg((DS1), (DS7)); and (3) a pessimistic move to the right by the minimum time value of data slew, (DS1). Having selected an amount of time by which to move the data slew to assure a fail, i.e., a LF=Last Fail, a first bisection point may be established halfway between the LF and the LP positions, i.e., (LF−LP)/2, which becomes the boundary for a subsequent binary search.

A timing simulation, employing a binary search, continues in the manner described above, moving either the upper boundary or the lower boundary to the last simulated bisection point, and iteratively simulating a new bisection point between new boundaries to form new search windows, when a Last Pass follows a Last Fail or alternatively, a Last Fail follows a Last Pass. The iterations of the bisection method may stop and may provide the timing constraint measurement, e.g., the setup time for corner sample point 2, when the difference between the last simulated value of the last bisection point and the newly simulated value of the new bisection point is less than the exit criterion of the specified error tolerance.

Referring to FIG. 4, having met the exit criteria, the time values of the data slews for the timing constraint measurements of corner sample points 1 and 2, i.e., (DS7, RS1) and (DS1, RS7), may be used to narrow the binary search windows for sample points 4 and 3, i.e., (DS7, RS7) and (DS1, RS1), respectively. The time value of the data slew for the timing constraint measurement of corner sample point 2, i.e., (DS1, RS7) may be "snapped" to the time value of the reference slew for corner sample point 3, i.e., (DS1, RS1), at their 50% points of amplitude, and a simulation may then be performed. The substitution of the time value of the data slew from the timing constraint measurement of corner sample point 2 for the initial time value of the data slew value for corner sample point 3 may result in a "narrowed" binary window that allows a reduction in the number of simulations required to exit from the tolerance criterion for corner sample point 3.

Similarly, the time value of the data slew for the timing constraint measurement of corner sample point 1, i.e., (DS7, RS1) may be "snapped" to the time value of the reference slew for corner sample point 4, i.e., (DS7, RS7), at their 50% points of amplitude, and a simulation may then be performed. The substitution of the time value of the data slew from the timing constraint measurement of corner sample point 1 for the initial time value of the data slew value for corner sample point 4 may result in a "narrowed" binary window that allows a reduction in the number of simulations required to exit from the tolerance criterion for corner sample point 4.

Both binary searches, for sample points 3 and 4, may then move either the upper boundary or the lower boundary to the last simulated bisection point, iteratively simulating a new bisection point between new boundaries to form new search windows. The iterations may stop and may provide the timing constraint measurements, e.g., the setup times for corner sample points 3 and 4, when the differences between the last simulated values of the last bisection points and the newly simulated values of the new bisection points are less than or equal to the exit criterion of a specified error tolerance.

The timing analysis of other sample points may benefit from prior timing analyses of adjacent sample points, including the corner sample points, according to the sequence of sample point analyses for the matrix. Referring to the sequence of sample point analyses in FIG. 6, if, for example, the time value of the data slew for the timing constraint of the setup time of corner sample point 1, (DS7, RS1), as determined above, and the time value of the data slew for the timing constraint of the setup time of sample point 5, (DS5, RS1), as determined by a binary search, were known, then the time value of the data slew for the timing constraint of the setup time of corner sample point 1, and the time value of the data slew for the timing constraint of the setup time for sample point 5, could form the upper boundary (UB) and the lower boundary (LB), respectively, of a binary search window used to determine the time value of the data slew for the timing constraint of the setup time for sample point 6, (DS6, RS1), i.e., Tsetup_6.

Figure 7:
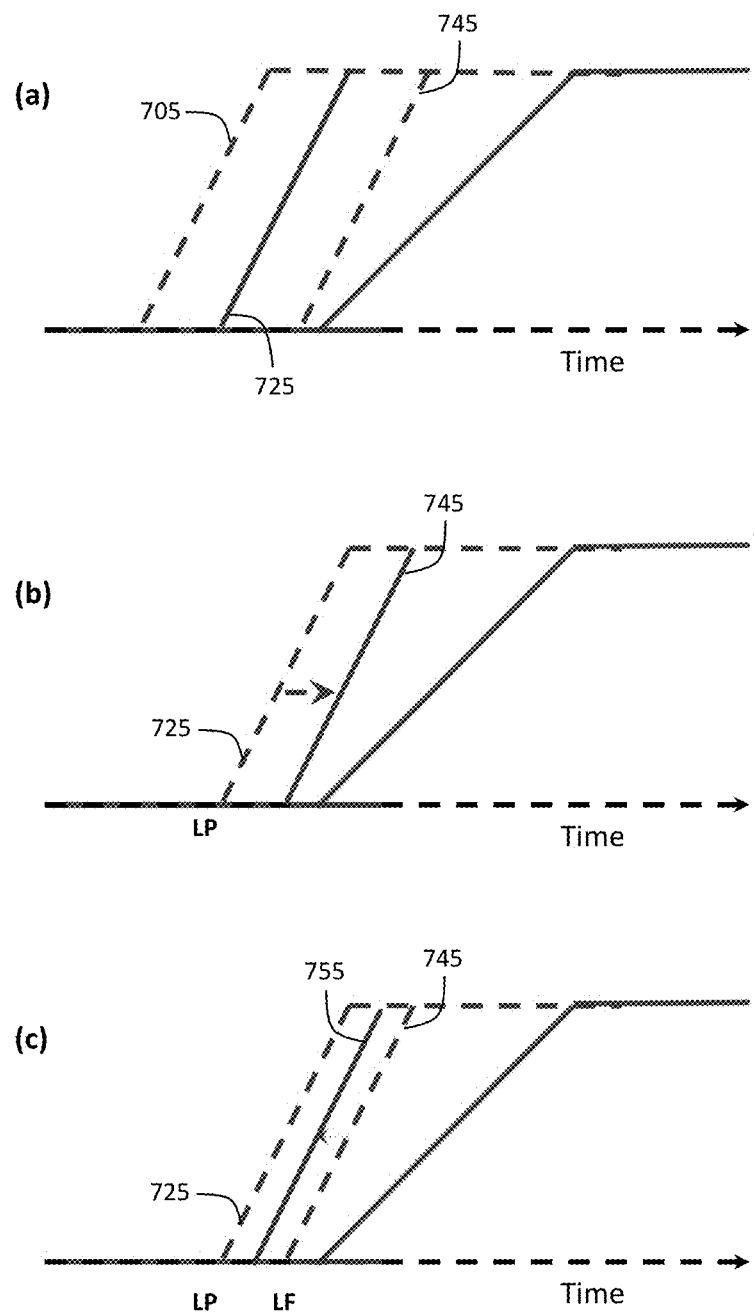
FIG. 7(a) is a schematic diagram illustrating that the time value of the data slew for sample point 5, of the ordered sequence, may be established to the left of (or less than) the time value of the data slew of sample point 6, Tsetup__6 725, while the time value of the data slew for corner sample point 1 may be established to the right of (or greater than) the time value of the data slew for sample point 6 in the method.
FIG. 7(b) is a schematic diagram illustrating that if the simulation passes, then the time value of the data slew of (DS6, RS1), which forms a LP=Last Pass, may be moved to the right by abs(Tsetup_LB+Tsetup_UB)/2 in the method.
FIG. 7(c) is a schematic diagram illustrating that the new bisection may only be performed by moving left, between the now LF=Last Fail and the LP=Last Pass in the method.

For example, referring to FIG. 7(a), the time value of the data slew from the timing constraint of the setup time for sample point 5, Tsetup_5 705, may be established to the left of (or less than) the initial time value of the data slew for the initial simulation of the setup time for the timing constraint of sample point 6, Tsetup_6 725, while the time value of the data slew from the timing constraint of the setup time of corner sample point 1, Tsetup_7 745, may be established to the right of (or greater than) the initial time value of the data slew for the initial simulation of the setup time for the timing constraint of sample point 6, Tsetup_6 725. The bounded initial time value of the data slew of sample point 6, (DS6, RS1), may be simulated upon moving to the left (decreasing) or to the right (increasing) by a step size equal to that of: abs(Tsetup_LB+Tsetup_UB)/2. Setup time simulations, for example, may be defined as, (time value of data slew)=((time value of reference slew)−abs(Tsetup_LB+Tsetup_UB)/2). If the setup time simulation passes, as shown in FIG. 7(b), then the time value of the data slew of (DS6, RS1) 725, which forms a LP=Last Pass 725, may be moved to the right by abs(Tsetup_LB+Tsetup_UB)/2 745. If the setup time simulation were to fail, then the data slew, (DS6, RS1) 725, which would form a LF=Last Fail, would be moved to the left by abs(Tsetup_LB+Tsetup_UB)/2. As above, a subsequent iterative simulation may require a new bisection point between new boundaries to form a new search window, when a Last Pass follows a Last Fail or alternatively, a Last Fail follows a Last Pass.

Assume in FIG. 7(c) that a simulation may not be moved to the right, as the simulation would fail. Hence, the bisection may only be performed by moving left, between the now LF=Last Fail 745 and the LP=Last Pass 725 to the new bisection 755. Further subsequent iterative simulations further bisect the window, until the difference between the last simulated value of the last bisection point and a newly simulated value of a new bisection point is less than or equal to a specified error tolerance. The LP=Last Pass may be reported as the timing constraint, e.g., setup time. This method iteratively narrows the window boundaries until the exit criteria may be met. As the binary search may be employed on initially narrowed windows derived from timing constraints of previously analyzed sample points, the number of iterative bisections required to determine a timing constraint may be reduced.

Figure 6:
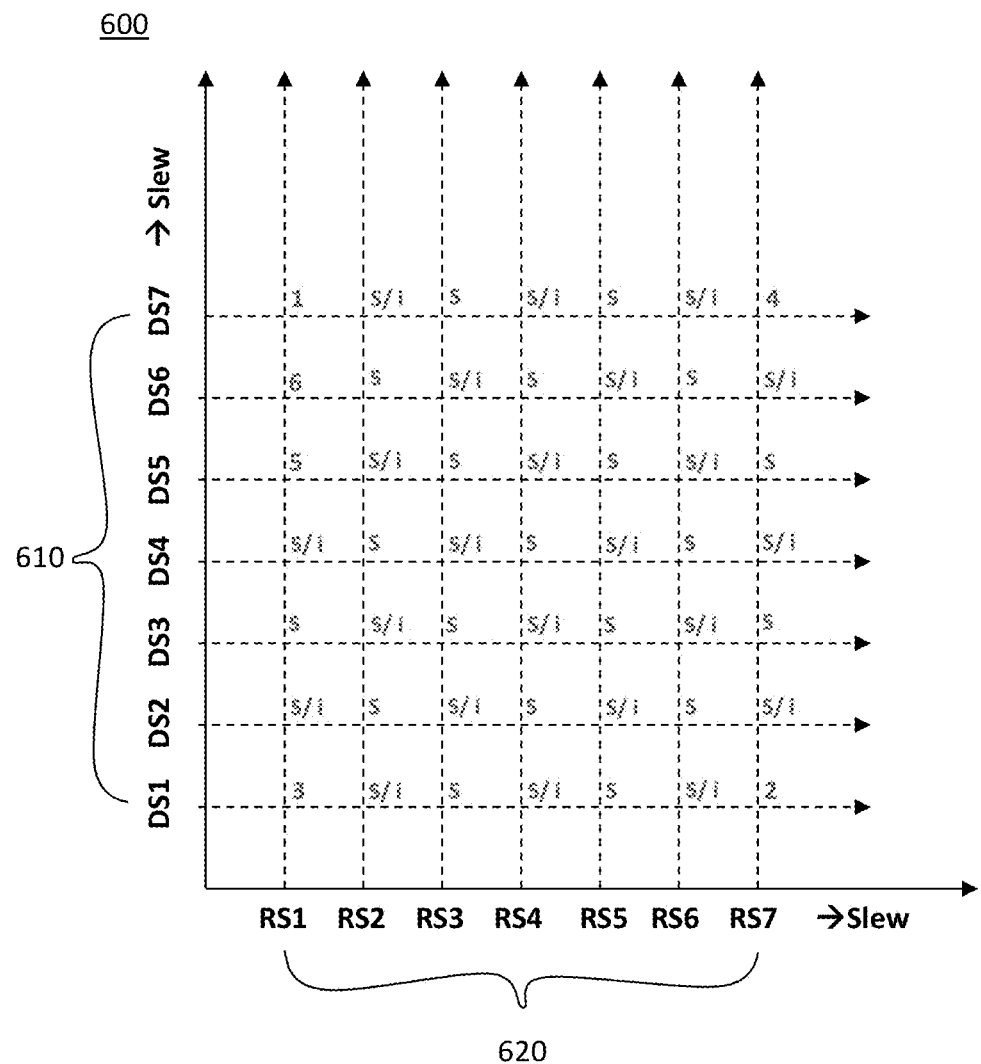
FIG. 6 is a schematic diagram illustrating an extension of FIG. 4 to an ordered sequence of 6 sample points, in which the first five sample points are simulated and the sixth sample point may be one of simulated and interpolated in the method.

Referring to FIG. 6, the exemplary sequence of sample points may accommodate the timing analysis of a sample point by interpolation, "i", rather than simulation in various methods. As discussed above in regard to the simulation of setup times of sample points, an initial time value of data slew for a sample point may be simulated to obtain either a Last Pass or a Last Fail, upon which result the data slew is moved right or left, respectively, by a selected step size. An initial Last Pass simulation must be followed by a subsequent Last Fail simulation, which defines the location of the first bisection point for a binary search; alternatively, an initial Last Fail simulation must be followed by a subsequent Last Pass simulation, which then defines the location of the first bisection point for a binary search.

In an interpolation method, the first two simulations may be avoided, and the timing constraint measurements from the sample points to the left and right of the to-be-interpolated sample point may form the initial bounds, i.e., (Tsetup_left, Tsetup_right).

Returning to FIG. 6, a linear interpolation of the timing constraints measurements to the left of the to-be-interpolated sample point, i.e., corner sample point 1, and to the right of the to-be-interpolated sample point, i.e., sample point 5, of the to-be-interpolated sample point 6, may provide the starting point for a binary search. Moves to the left (increasing value) or to the right (decreasing value) of the starting point may be made using an average of the initial bounds, i.e., (Tsetup_left+Tsetup_right)/2. As above, a subsequent iterative simulation requiring a new bisection point between new boundaries to form a new search window, may only occur when a Last Pass follows a Last Fail or alternatively, a Last Fail follows a Last Pass. Further subsequent iterative simulations may further bisect the window, until the difference between the last simulated value of the last bisection point and a newly simulated value of a new bisection point is less than the specified error tolerance, which validates the interpolation. The LP=Last Pass may be reported as the timing constraint, e.g., setup time.

If the interpolation method above fails, validation of the interpolation may require subsequent iterative simulations from the starting point, using maximum time values of the data slew of the interpolated sample point, e.g., (DS6, RS1), for the moves to the left (increasing value) or to the right (decreasing value) of the interpolated starting point, rather than using an average of the initial bounds, i.e., (Tsetup_left+Tsetup_right)/2. As above, a subsequent iterative simulation requiring a new bisection point between new boundaries to form a new search window, may only occur when a Last Pass follows a Last Fail or alternatively, a Last Fail follows a Last Pass. Further subsequent iterative simulations may further bisect the window, until the difference between the last simulated value of the last bisection point and a newly simulated value of a new bisection point is less than the specified error tolerance, which validates the interpolation.

Figure 8:
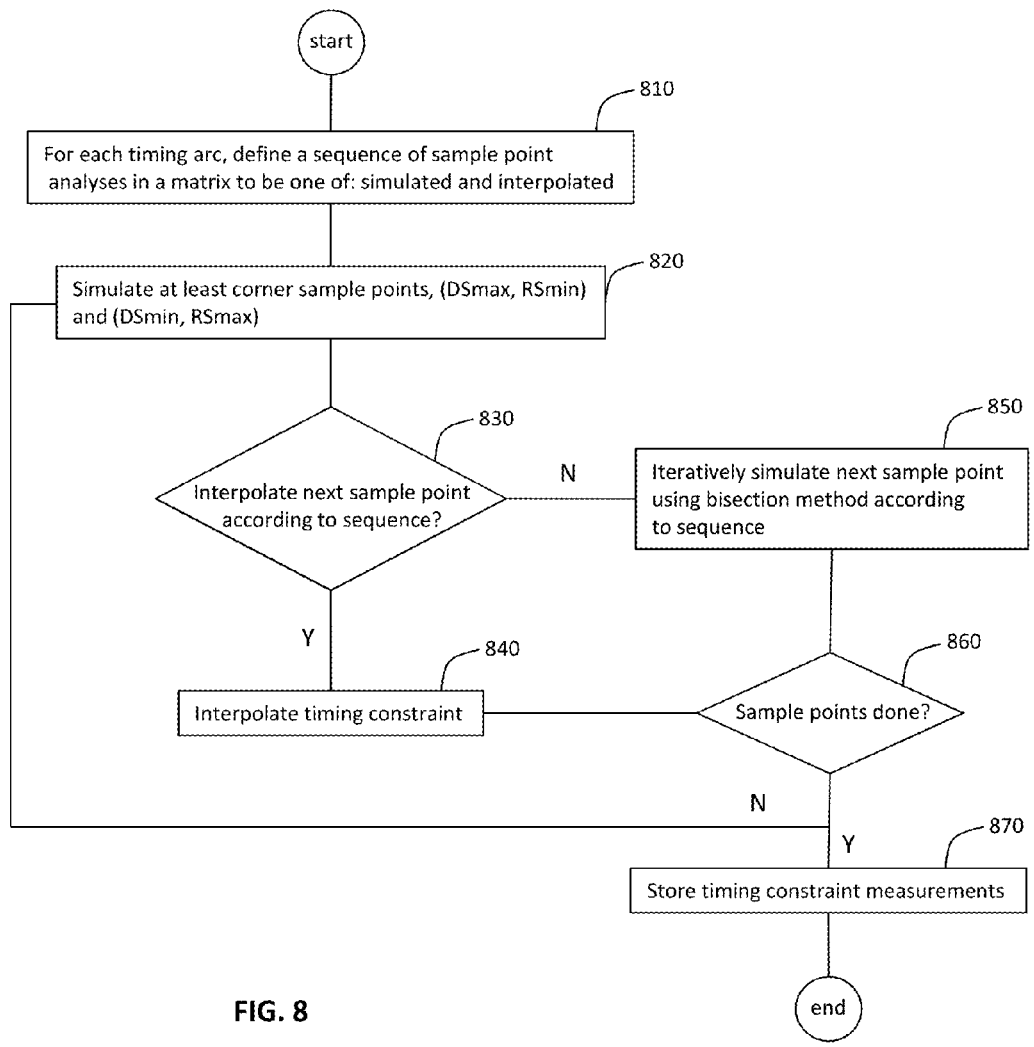
FIG. 8 is a flow chart illustrating a method for determining time constraints of each timing arc of a digital IC, where the timing arcs may be one of: simulated and interpolated in the method.

Referring to FIG. 8, a flow chart of the method for determining time constraints for each timing arc of a digital IC is illustrated. For each timing arc, a corresponding sample point, comprising a data slew and a reference slew, may be retrieved from liberty files, and defined on the matrix, where each sample point is one of: a simulated point and an interpolated sample point, according to a sequence of sample point analyses, 810. Initially, at least the corner sample points, (DSmax, RSmin) and (DSmin, RSmax), corresponding to the minimum and maximum timing constraints stored in the liberty files for cells of the same technology, may be simulated, 820. The next sample point from the sequence may be accessed and it is determined, if an interpolation method may to be used to determine the timing constraint, 830. If the timing constraint of the next sample point is to be interpolated, then an interpolation may be performed 840. Otherwise, a timing constraint for the next sample point from the sequence is determined by simulations, using a binary method, 850. After each interpolation or each simulation of a sample point is performed, it is determined whether all of the sample points have been analyzed, 860. If all of the sample points have been analyzed, the resulting timing constraint measurements may be stored for use in generating a model of the digital IC 870.

Figure 9:
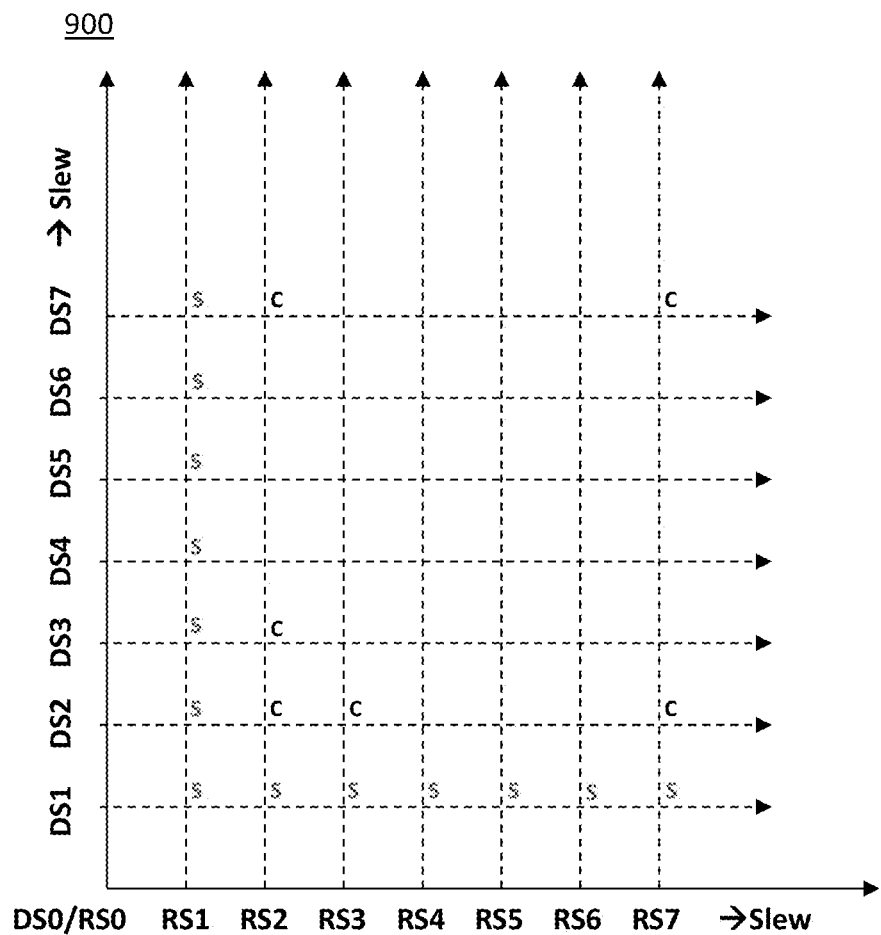
FIG. 9 is a schematic diagram illustrating another ordered sequence of sample points that may be defined across a matrix, where "s" designates sample points that are simulated, and "c" designates sample points that are computed in another method.

Referring to FIG. 9, another exemplary sequence of sample points may be defined across a matrix 900, where "s" designates sample points that are simulated, and "c" designates sample points that are computed. As above, initial simulations for this exemplary sequence of sample points may begin with determining the timing constraint measurements for corner sample points 1 and 2, i.e., (DS7, RS1) and (DS1, RS7). Subsequent simulations, using the results of the binary method, from (DS1, RS1) through each adjoining sample point to (DS7, RS7), and from (DS1, RS1) through each adjoining sample point (DS1, RS7), may be bounded to the left (decreasing) by a lower bound (LB) and to the right (increasing) by an upper bound (UB). Step sizes to the left (decreasing value) or to the right (increasing value) of the starting bisection point of each adjoining sample point may be made using an average of the initial bounds, i.e., (Tsetup_left+Tsetup_right)/2. The computed time value (TC) for the data slew of each computed sample point may equal: $TC\_(DSn, RSn)=T\_(DS0, RSn)+T\_(DSn, RS0)-T\_(DS0, RS0)$, where n=1 to n. The computed time value of TC_(DSn, RSn) may then be validated by simulating a left step or a right step by the step size of the computed time value (TC) to get a pass or a fail. If the simulation passes, as a LP=Last Pass, then the time value of the data slew may be moved left by the computed time value, TC. If the simulation fails, as a LF=Last Fail, then the time value of the data slew may be moved right by the computed time value, TC. The computed sample points may use the corresponding computed time values for step sizes, which may be continued until one of: a LP immediately followed by LF, and a LF immediately followed by a LP, is achieved. If the difference between LP and LF are less than or equal to a specified error tolerance, the LP may be reported as the computed time value, TC.

As will be appreciated by one skilled in the art, aspects of the systems and methods herein may be embodied as a system, method or computer program product. Accordingly, aspects of the present disclosure may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present disclosure may take the form of a computer program product embodied in one or more computer readable medium(s) having computer readable program code embodied thereon.

Any combination of one or more computer readable non-transitory medium(s) may be utilized. The computer readable medium may be a computer readable signal medium or a computer readable storage medium. The non-transitory computer storage medium stores instructions, and a processor executes the instructions to perform the methods described herein. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present disclosure may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present disclosure are described below with reference to flowchart illustrations and/or block diagrams of methods, apparatus (systems) and computer program products. It will be understood that each block of the flowchart illustrations and/or two-dimensional block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

Figure 10:
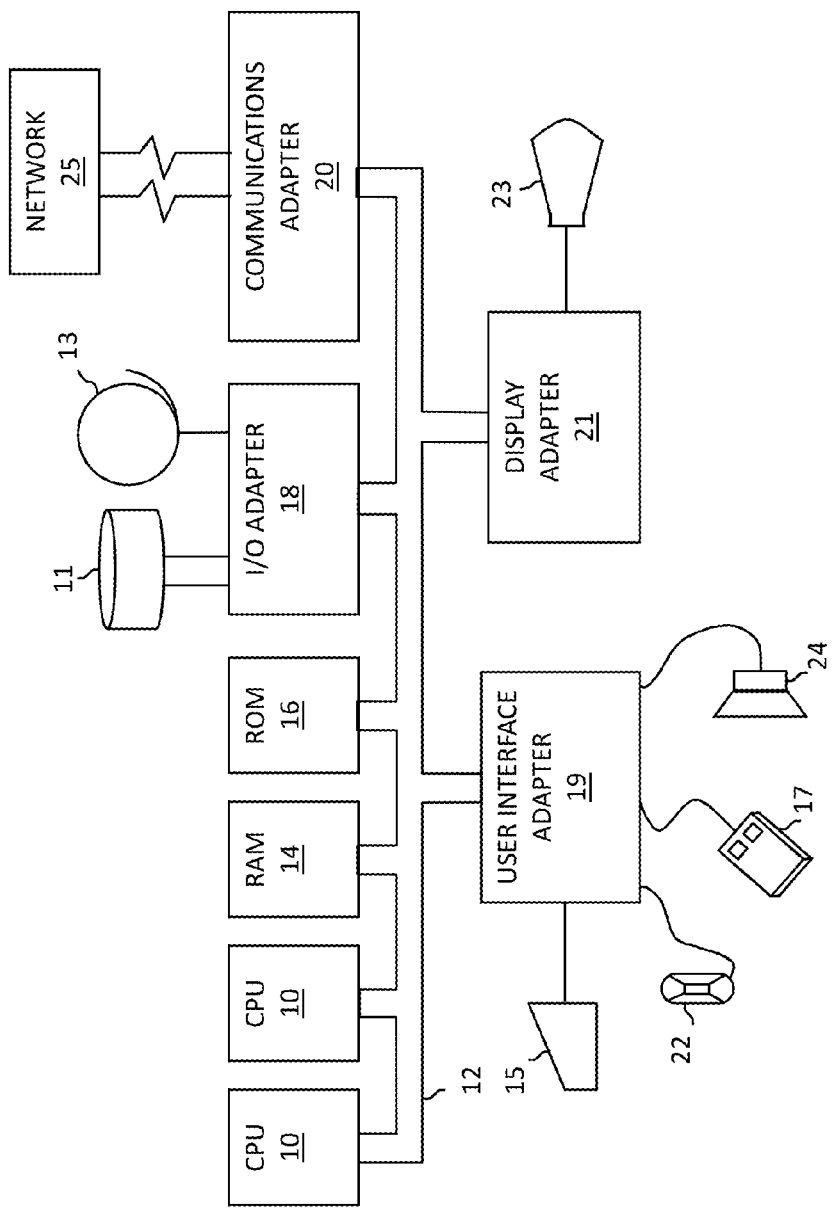
FIG. 10 is a schematic diagram of a deployment system according to methods herein.

A representative hardware environment for practicing the methods and products herein is depicted in FIG. 10. This schematic drawing illustrates a hardware configuration of an information handling/computer system in accordance with the methods and products herein. The system comprises at least one processor or central processing unit (CPU) 10. The CPUs 10 are interconnected via system bus 12 to various devices such as a random access memory (RAM) 14, read-only memory (ROM) 16, and an input/output (I/O) adapter

18. The I/O adapter 18 can connect to peripheral devices, such as disk units 11 and tape drives 13, or other program storage devices that are readable by the system. The system can read the inventive instructions on the program storage devices and follow these instructions to execute the methodology of the methods and products herein. The system further includes a user interface adapter 19 that connects a keyboard 15, mouse 17, speaker 24, microphone 22, and/or other user interface devices such as a touch screen device (not shown) to the bus 12 to gather user input. Additionally, a communication adapter 20 connects the bus 12 to a data processing network 25, and a display adapter 21 connects the bus 12 to a display device 23 which may be embodied as an output device such as a monitor, printer, or transmitter, for example.

Figure 11:
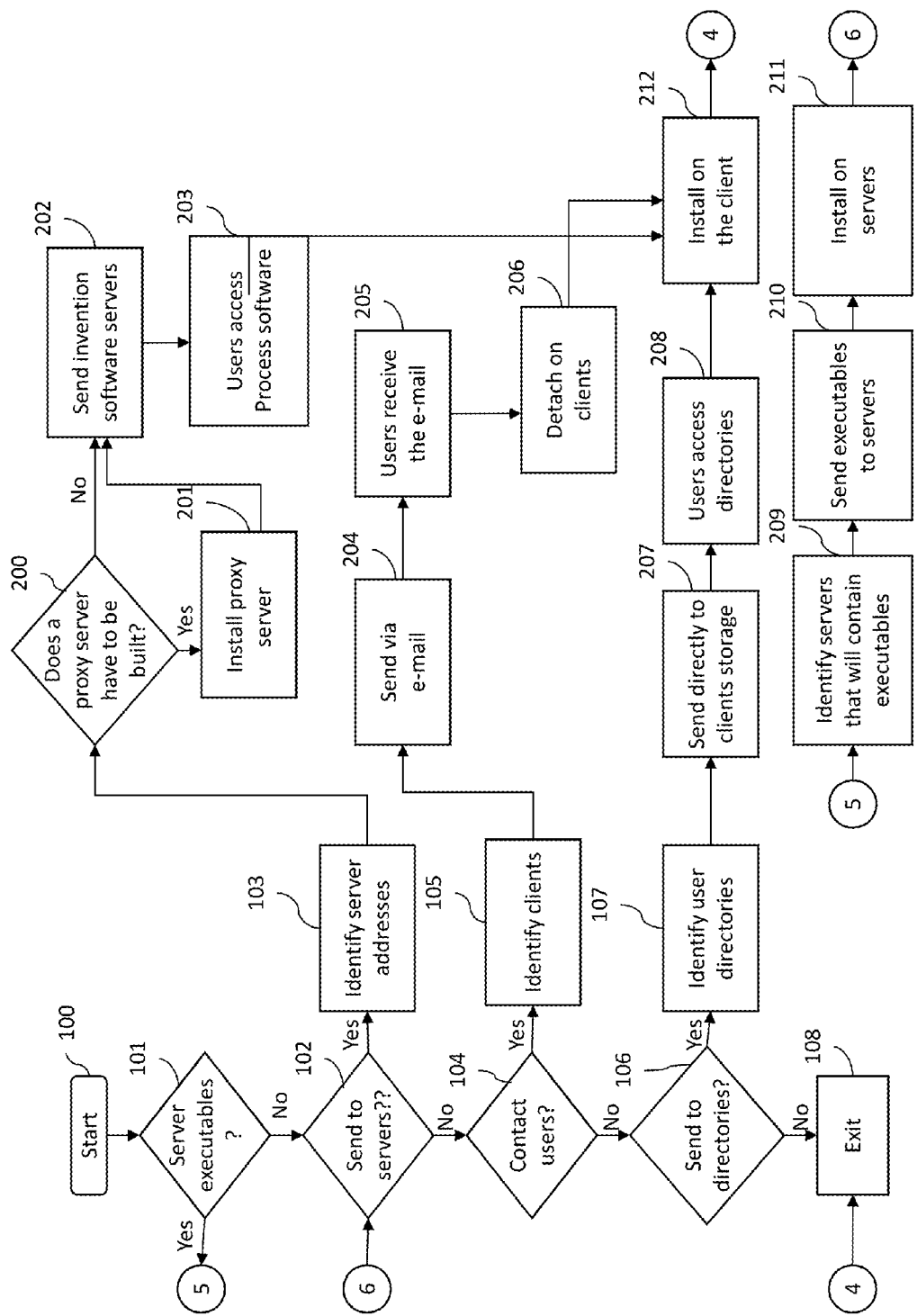
FIG. 11 is a schematic diagram of an integration system according to methods herein.

The flowchart and block diagrams in FIG. 11 illustrate the architecture, functionality, and operation of possible implementations of systems, methods and computer program products. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

Deployment Types include loading directly in the client, server and proxy computers via loading a storage medium such as a CD, DVD, etc. The process software may also be automatically or semi-automatically deployed into a computer system by sending the process software to a central server or a group of central servers. The process software is then downloaded into the client computers that will execute the process software. The process software is sent directly to the client system via e-mail. The process software is then either detached to a directory or loaded into a directory by a button on the e-mail that executes a program that detaches the process software into a directory. Send the process software directly to a directory on the client computer hard drive. When there are proxy servers, the process will, select the proxy server code, determine on which computers to place the proxy servers' code, transmit the proxy server code, and then install the proxy server code on the proxy computer. The process software will be transmitted to the proxy server then stored on the proxy server.

While it is understood that the process software may be deployed by manually loading directly in the client, server and proxy computers via loading a storage medium such as a CD, DVD, etc., the process software may also be automatically or semi-automatically deployed into a computer system by sending the process software to a central server or a group of central servers. The process software is then downloaded into the client computers that will execute the process software. Alternatively the process software is sent directly to the client system via e-mail. The process software is then either detached to a directory or loaded into a directory by a button on the e-mail that executes a program that detaches the process software into a directory. Another alternative is to send the process software directly to a directory on the client computer hard drive. When there are proxy servers, the process will, select the proxy server code, determine on which computers to place the proxy servers' code, transmit the proxy server code, then install the proxy server code on the proxy computer. The process software will be transmitted to the proxy server then stored on the proxy server.

In FIG. 11, Step 100 begins the deployment of the process software. The first thing is to determine if there are any programs that will reside on a server or servers when the process software is executed 101. If this is the case then the servers that will contain the executables are identified 209. The process software for the server or servers is transferred directly to the servers' storage via FTP or some other protocol or by copying though the use of a shared file system 210. The process software is then installed on the servers 211.

Next, a determination is made on whether the process software is be deployed by having users access the process software on a server or servers 102. If the users are to access the process software on servers then the server addresses that will store the process software are identified 103.

A determination is made if a proxy server is to be built 200 to store the process software. A proxy server is a server that sits between a client application, such as a Web browser, and a real server. It intercepts all requests to the real server to see if it can fulfill the requests itself. If not, it forwards the request to the real server. The two primary benefits of a proxy server are to improve performance and to filter requests. If a proxy server is required then the proxy server is installed 201. The process software is sent to the servers either via a protocol such as FTP or it is copied directly from the source files to the server files via file sharing 202. Another embodiment would be to send a transaction to the servers that contained the process software and have the server process the transaction, then receive and copy the process software to the server's file system. Once the process software is stored at the servers, the users via their client computers, then access the process software on the servers and copy to their client computers file systems 203. Another embodiment is to have the servers automatically copy the process software to each client and then run the installation program for the process software at each client computer. The user executes the program that installs the process software on his client computer 212 then exits the process 108.

In step 104 a determination is made whether the process software is to be deployed by sending the process software to users via e-mail. The set of users where the process software will be deployed are identified together with the addresses of the user client computers 105. The process software is sent via e-mail to each of the users' client computers. The users then receive the e-mail 205 and then detach the process software from the e-mail to a directory on their client computers 206. The user executes the program that installs the process software on his client computer 212 then exits the process 108.

Lastly a determination is made on whether to the process software will be sent directly to user directories on their client computers 106. If so, the user directories are identified 107. The process software is transferred directly to the user's client computer directory 207. This can be done in several ways such as but not limited to sharing of the file system directories and then copying from the sender's file system to the recipient user's file system or alternatively using a transfer protocol such as File Transfer Protocol (FTP). The users access the directories on their client file systems in preparation for installing the process software 208. The user executes the program that installs the process software on his client computer 212 then exits the process 108.

The process software is integrated into a client, server and network environment by providing for the process software to coexist with applications, operating systems and network operating systems software and then installing the process software on the clients and servers in the environment where the process software will function.

The first step is to identify any software on the clients and servers including the network operating system where the process software will be deployed that are required by the process software or that work in conjunction with the process software. This includes the network operating system that is software that enhances a basic operating system by adding networking features.

Next, the software applications and version numbers will be identified and compared to the list of software applications and version numbers that have been tested to work with the process software. Those software applications that are missing or that do not match the correct version will be upgraded with the correct version numbers. Program instructions that pass parameters from the process software to the software applications will be checked to ensure the parameter lists matches the parameter lists required by the process software. Conversely parameters passed by the software applications to the process software will be checked to ensure the parameters match the parameters required by the process software. The client and server operating systems including the network operating systems will be identified and compared to the list of operating systems, version numbers and network software that have been tested to work with the process software. Those operating systems, version numbers and network software that do not match the list of tested operating systems and version numbers will be upgraded on the clients and servers to the required level.

After ensuring that the software, where the process software is to be deployed, is at the correct version level that has been tested to work with the process software, the integration is completed by installing the process software on the clients and servers.

Figure 12:
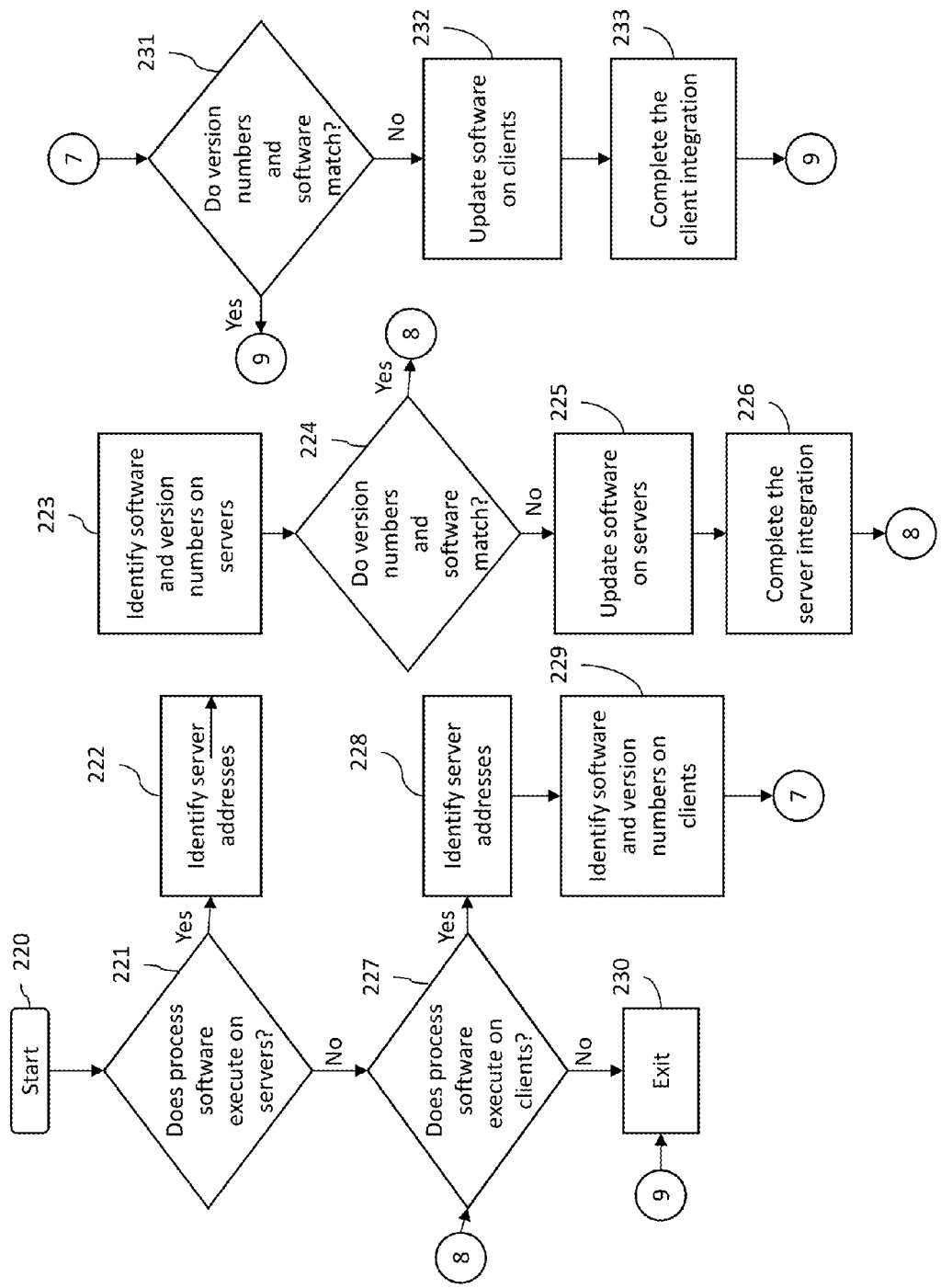
FIG. 12 is a schematic diagram of an on demand system according to methods herein.

In FIG. 12, Step 220 begins the integration of the process software. The first thing is to determine if there are any process software programs that will execute on a server or servers 221. If this is not the case, then integration proceeds to 227. If this is the case, then the server addresses are identified 222. The servers are checked to see if they contain software that includes the operating system (OS), applications, and network operating systems (NOS), together with their version numbers, that have been tested with the process software 223. The servers are also checked to determine if there is any missing software that is required by the process software 223.

A determination is made if the version numbers match the version numbers of OS, applications and NOS that have been tested with the process software 224. If all of the versions match and there is no missing required software the integration continues in 227.

If one or more of the version numbers do not match, then the unmatched versions are updated on the server or servers with the correct versions 225. Additionally if there is missing required software, then it is updated on the server or servers 225. The server integration is completed by installing the process software 226.

Step 227 which follows 221, 224 or 226 determines if there are any programs of the process software that will execute on the clients. If no process software programs execute on the clients the integration proceeds to 230 and exits. If this not the case, then the client addresses are identified 228.

The clients are checked to see if they contain software that includes the operating system (OS), applications, and network operating systems (NOS), together with their version numbers, that have been tested with the process software 229.

The clients are also checked to determine if there is any missing software that is required by the process software 229.

A determination is made as to whether the version numbers match the version numbers of OS, applications and NOS that have been tested with the process software 231. If all of the versions match and there is no missing required software, then the integration proceeds to 230 and exits.

If one or more of the version numbers do not match, then the unmatched versions are updated on the clients with the correct versions 232. In addition, if there is missing required software then it is updated on the clients 232. The client integration is completed by installing the process software on the clients 233. The integration proceeds to 230 and exits.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc. When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload Likewise when other measurements of use such as network bandwidth, memory usage, storage usage, etc. approach a capacity so as to effect performance, additional network bandwidth, memory usage, storage etc. are added to share the workload. The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider. In another embodiment, the service provider requests payment directly from a customer account at a banking or financial institution. In another embodiment, if the service provider is also a customer of the customer that uses the process software application, the payment owed to the service provider is reconciled to the payment owed by the service provider to minimize the transfer of payments.

The process software is shared, simultaneously serving multiple customers in a flexible, automated fashion. It is standardized, requiring little customization and it is scalable, providing capacity on demand in a pay-as-you-go model.

The process software can be stored on a shared file system accessible from one or more servers. The process software is executed via transactions that contain data and server processing requests that use CPU units on the accessed server. CPU units are units of time such as minutes, seconds, hours on the central processor of the server. Additionally the assessed server may make requests of other servers that require CPU units. CPU units are an example that represents but one measurement of use. Other measurements of use include but are not limited to network bandwidth, memory usage, storage usage, packet transfers, complete transactions etc.

When multiple customers use the same process software application, their transactions are differentiated by the parameters included in the transactions that identify the unique customer and the type of service for that customer. All of the CPU units and other measurements of use that are used for the services for each customer are recorded. When the number of transactions to any one server reaches a number that begins to affect the performance of that server, other servers are accessed to increase the capacity and to share the workload. Likewise when other measurements of use such as network bandwidth, memory usage, storage usage, etc. approach a capacity so as to effect performance, additional network bandwidth, memory usage, storage etc. are added to share the workload.

The measurements of use used for each service and customer are sent to a collecting server that sums the measurements of use for each customer for each service that was processed anywhere in the network of servers that provide the shared execution of the process software. The summed measurements of use units are periodically multiplied by unit costs and the resulting total process software application service costs are alternatively sent to the customer and or indicated on a web site accessed by the customer which then remits payment to the service provider.

In another embodiment, the service provider requests payment directly from a customer account at a banking or financial institution.

In another embodiment, if the service provider is also a customer of the customer that uses the process software application, the payment owed to the service provider is reconciled to the payment owed by the service provider to minimize the transfer of payments.

Figure 13:
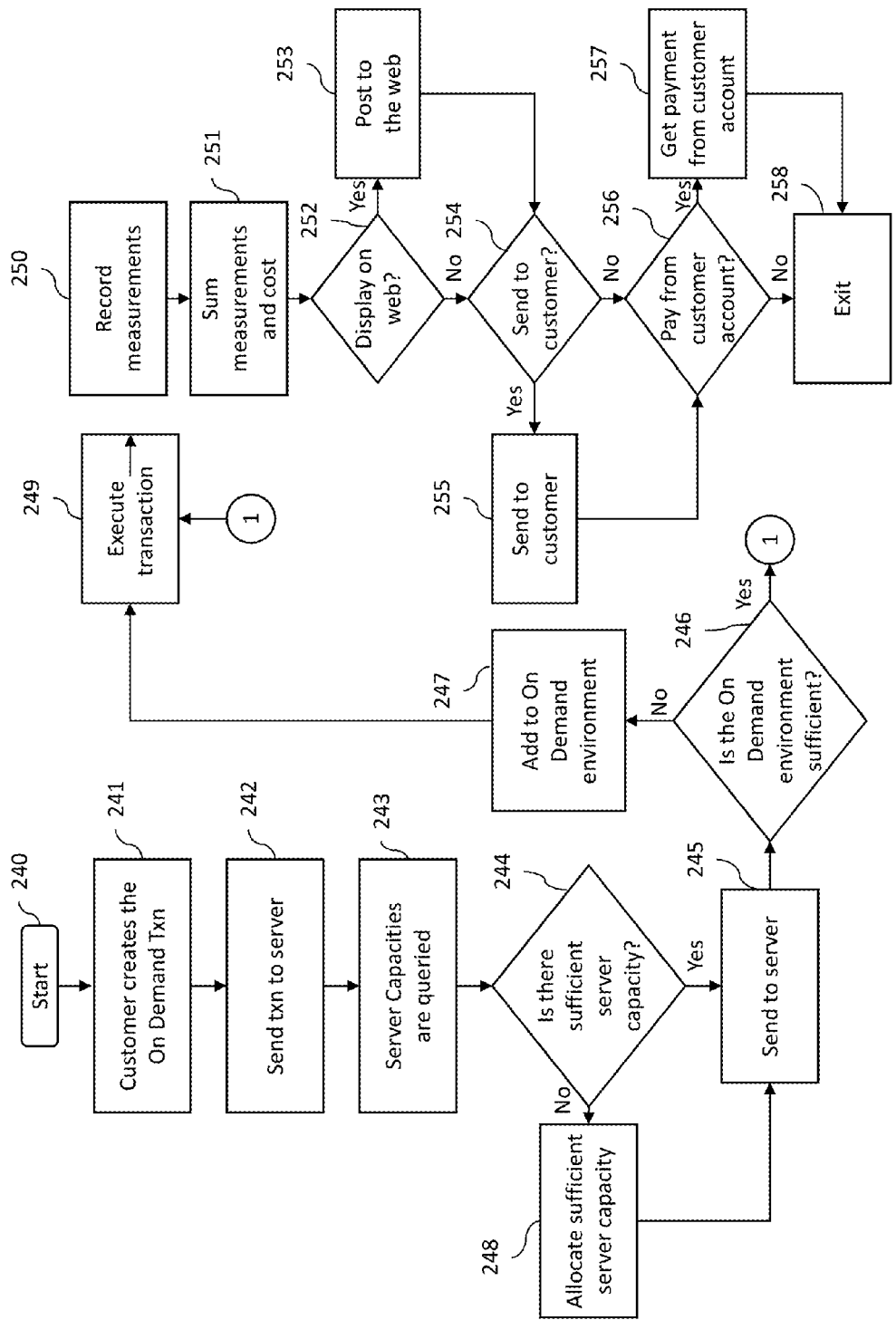
FIG. 13 is a schematic diagram of a virtual private network system according to methods herein.

In FIG. 13, Step 240 begins the On Demand process. A transaction is created than contains the unique customer identification, the requested service type and any service parameters that further specify the type of service 241. The transaction is then sent to the main server 242. In an On Demand environment the main server can initially be the only server, then as capacity is consumed other servers are added to the On Demand environment.

The server central processing unit (CPU) capacities in the On Demand environment are queried 243. The CPU requirement of the transaction is estimated, then the servers available CPU capacity in the On Demand environment are compared to the transaction CPU requirement to see if there is sufficient CPU available capacity in any server to process the transaction 244. If there is not sufficient server CPU available capacity, then additional server CPU capacity is allocated to process the transaction 248. If there was already sufficient Available CPU capacity then the transaction is sent to a selected server 245.

Before executing the transaction, a check is made of the remaining On Demand environment to determine if the environment has sufficient available capacity for processing the transaction. This environment capacity consists of such things as but not limited to network bandwidth, processor memory, storage etc. 246. If there is not sufficient available capacity, then capacity will be added to the On Demand environment 247. Next the required software to process the transaction is accessed, loaded into memory, then the transaction is executed 249.

The usage measurements are recorded 250. The usage measurements consist of the portions of those functions in the On Demand environment that is used to process the transaction. The usage of such functions as, but not limited to, network bandwidth, processor memory, storage and CPU cycles are what is recorded. The usage measurements are summed, multiplied by unit costs and then recorded as a charge to the requesting customer 251. If the customer has requested that the On Demand costs be posted to a web site 252 then they are posted 253.

If the customer has requested that the On Demand costs be sent via e-mail to a customer address 254 then they are sent 255. If the customer has requested that the On Demand costs be paid directly from a customer account 256 then payment is received directly from the customer account 257. The last step is exit the On Demand process.

The process software may be deployed, accessed and executed through the use of a virtual private network (VPN), which is any combination of technologies that can be used to secure a connection through an otherwise unsecured or untrusted network. The use of VPNs is to improve security and for reduced operational costs. The VPN makes use of a public network, usually the Internet, to connect remote sites or users together. Instead of using a dedicated, real-world connection such as leased line, the VPN uses "virtual" connections routed through the Internet from the company's private network to the remote site or employee.

The process software may be deployed, accessed and executed through either a remote-access or a site-to-site VPN. When using the remote-access VPNs the process software is deployed, accessed and executed via the secure, encrypted connections between a company's private network and remote users through a third-party service provider. The enterprise service provider (ESP) sets a network access server (NAS) and provides the remote users with desktop client software for their computers. The telecommuters can then dial a toll-free number or attach directly via a cable or DSL modem to reach the NAS and use their VPN client software to access the corporate network and to access, download and execute the process software.

When using the site-to-site VPN, the process software is deployed, accessed and executed through the use of dedicated equipment and large-scale encryption that are used to connect a companies multiple fixed sites over a public network such as the Internet.

The process software is transported over the VPN via tunneling which is the process of placing an entire packet within another packet and sending it over a network. The protocol of the outer packet is understood by the network and both points, called tunnel interfaces, where the packet enters and exits the network.

Figure 14:
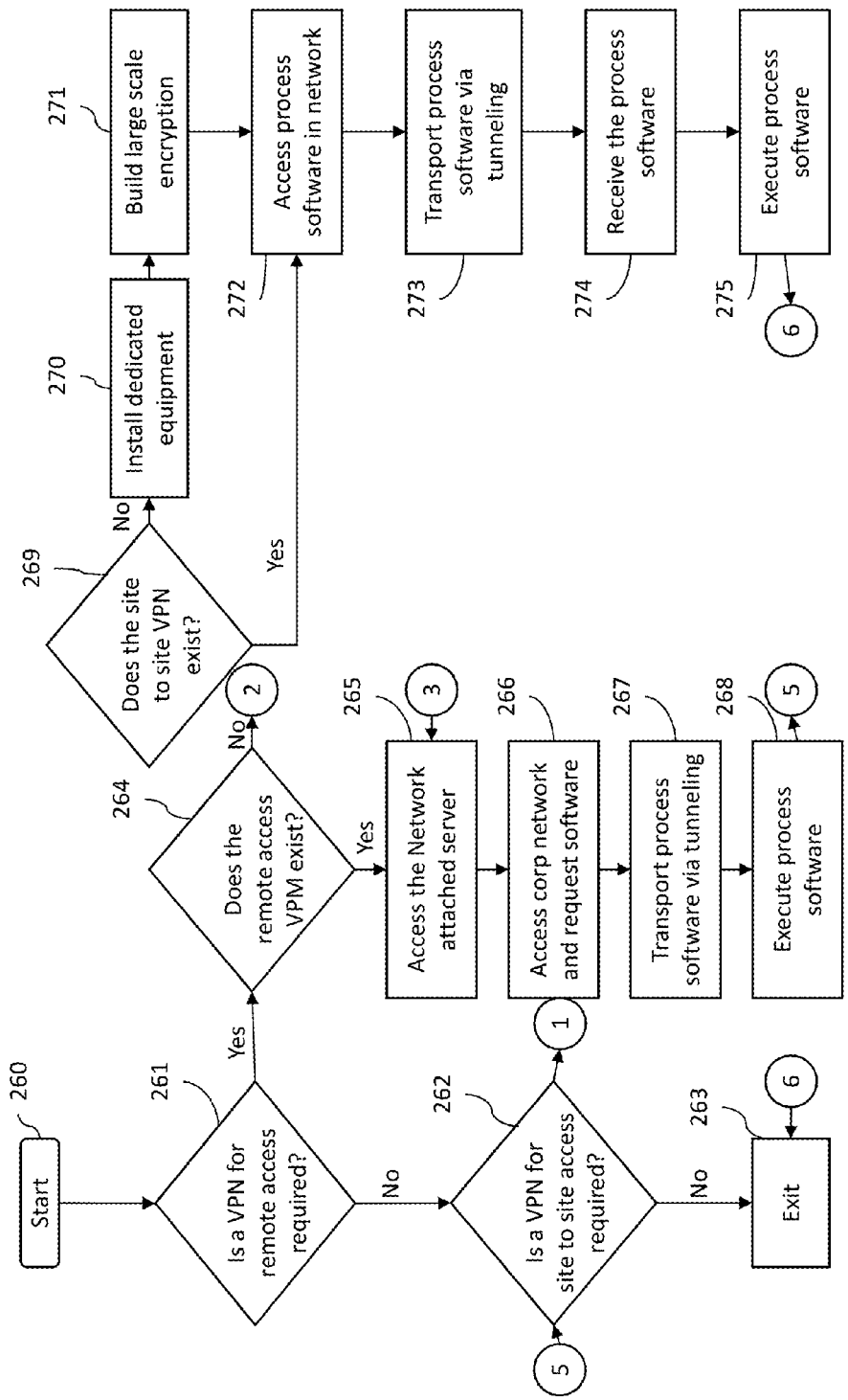
FIG. 14 is a schematic diagram of a virtual private network system according to methods herein.
Figure 15:
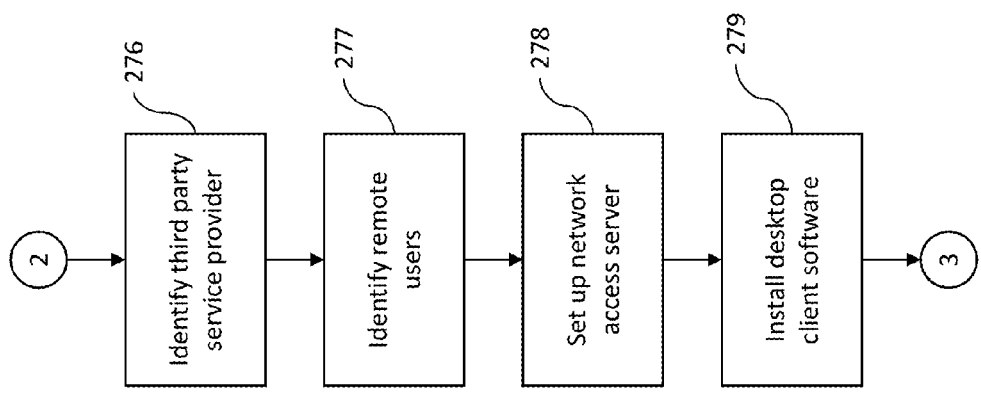
FIG. 15 is a schematic diagram of a hardware system according to methods herein.

In FIGS. 14 and 15, Step 260 begins the Virtual Private Network (VPN) process. A determination is made to see if a VPN for remote access is required 261. If it is not required, then proceed to 262. If it is required, then determine if the remote access VPN exists 264.

If it does exist, then proceed to 265. Otherwise identify the third party provider that will provide the secure, encrypted connections between the company's private network and the company's remote users 276. The company's remote users are identified 277. The third party provider then sets up a network access server (NAS) 278 that allows the remote users to dial a toll free number or attach directly via a cable or DSL modem to access, download and install the desktop client software for the remote-access VPN 279.

After the remote access VPN has been built or if it been previously installed, the remote users can then access the process software by dialing into the NAS or attaching directly via a cable or DSL modem into the NAS 265. This allows entry into the corporate network where the process software is accessed 266. The process software is transported to the remote user's desktop over the network via tunneling. That is the process software is divided into packets and each packet including the data and protocol is placed within another packet 267. When the process software arrives at the remote user's desktop, it is removed from the packets, reconstituted and then is executed on the remote users desktop 268.

A determination is made to see if a VPN for site to site access is required 262. If it is not required, then proceed to exit the process 263. Otherwise, determine if the site to site VPN exists 269. If it does exist, then proceed to 272. Otherwise, install the dedicated equipment required to establish a site to site VPN 270. Then build the large scale encryption into the VPN 271.

After the site to site VPN has been built or if it had been previously established, the users access the process software via the VPN 272. The process software is transported to the site users over the network via tunneling. That is the process software is divided into packets and each packet including the data and protocol is placed within another packet 274. When the process software arrives at the remote user's desktop, it is removed from the packets, reconstituted and is executed on the site users desktop 275. Proceed to exit the process 263.

The terminology used herein is for the purpose of describing particular methods and products only and is not intended to be limiting of this disclosure. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The descriptions of the various methods and products have been presented for purposes of illustration, but are not intended to be exhaustive or limited to the methods and products disclosed. Many modifications and variations will be apparent to those of ordinary skill in the art without departing from the scope and spirit of the described methods and products. The terminology used herein was chosen to best explain the principles of the methods and products, the practical application or technical improvement over technologies found in the marketplace, or to enable others of ordinary skill in the art to understand the methods and products disclosed herein.

What is claimed is:

1. A computer-implemented method for determining timing constraint analyses of an integrated circuit (IC), said method comprising:
   defining, by a computer, a sequence of sample points for timing constraint analyses in an n×n matrix, each sample point corresponding to a timing arc of said IC that includes a data slew and a reference slew, which is analyzed by one of: simulation and interpolation;
   simulating, by said computer, corner sample points of said matrix, according to said sequence, by:
      substituting minimum and maximum timing constraints from files of said IC, for time values of said data slews;
      establishing a step size based on said minimum and maximum timing constraints for a starting bisection point of a binary search; and
      conducting said binary search from said starting bisection point and using a result from said binary search to simulate said timing constraint analyses for each of said corner sample points; and
   interpolating, by said computer, other sample points, according to said sequence, each of said other sample points having a starting bisection point that results from linear interpolation of said timing constraint analyses from adjoining sample points, which were simulated.

2. The method of claim 1, further comprising:
   simulating additional sample points, according to said sequence, at least one of boundary for said starting bisection point of said additional sample points being narrowed by one of said timing constraint analyses of said corner sample points;
   establishing a step size based on minimum and maximum time values of said data slew of said additional sample point for a starting bisection point; and
   conducting an iterative binary search from said starting bisection point to simulate said timing constraint analyses for each of said additional sample points.

3. The method of claim 2, further comprising:
   simulating additional sample points, according to said sequence, at least one boundary for said starting bisection point of said additional sample points being narrowed by said timing constraint analyses for said additional sample points;
   establishing a step size based on minimum and maximum time values of said data slew of said additional sample point for a starting bisection point; and
   conducting an iterative binary search from said starting bisection point to simulate said timing constraint analyses for each of said additional sample points.

4. The method of claim 1, said reference slew of each sample point including a value of pushout, stored in said files.

5. The method of claim 1, said establishing a time value of said step size based on said minimum and maximum timing constraints including one of: said maximum timing constraint, an average of said maximum timing constraint and said minimum timing constraint, and said minimum timing constraint.

6. The method of claim 1, each iterative binary search iteratively simulating a new bisection point between new boundaries to form a new search window, when one of: a passed simulation follows a failed simulation, and a failed simulation follows a passed simulation.

7. The method of claim 6, said iteratively simulating a new bisection point comprising stopping and providing a timing constraint measurement when a difference between a last simulated value of a last bisection point and a newly simulated value of a new bisection point is less than an exit criterion of a specified error tolerance.

8. The method of claim 1, further comprising using a step size defined by an average of said timing constraint analyses from said adjoining sample points for said starting bisection point in said interpolating, iteratively simulating a new bisection point between new boundaries to form a new search window, when one of: a passed simulation follows a failed simulation, and a failed simulation follows a passed simulation, and stopping said iterative simulating when a difference between a last simulated value of a last bisection point and a newly simulated value of a new bisection point is less than an exit criterion of a specified error tolerance.

9. A computer-implemented method for determining timing constraint analyses of an integrated circuit (IC), said method comprising:

defining, by a computer, sample points for timing constraint analyses in an n×n matrix, each sample point corresponding to a timing arc of said IC that includes a data slew (DS) and a reference slew (RS);

initially simulating, by said computer, first and second sample points corresponding to (DSmax, RSmin) and (DSmin, RSmax), respectively, of said matrix by:

substituting minimum and maximum timing constraints from files of said IC, for time values of said data slews;

establishing a step size based on said minimum and maximum timing constraints for a starting bisection point of a binary search; and conducting said binary search from said starting bisection point and using a result from said binary search to simulate said timing constraint analyses for each simulated sample point;

subsequently simulating, by said computer, each sample point in a first column of said matrix including said first sample point and each sample point in a first row of said matrix including said second sample point;

computing, by said computer, a computed time value (TC) for any sample points other than those that have been simulated, where TC_(DSn, RSn) may equal T_(DS0, RSn)+T_(DSn, RS0)−T_(DS0, RS0), as a starting bisection point for determining said result from said binary search; and validating, by said computer, each said computed time value (TC) by a single simulation.

10. The method of claim 9, said each reference slew of each sample point including a value of pushout, stored in said files.

11. The method of claim 9, said initially simulating further comprising establishing a step size based on said minimum and maximum timing constraints for a starting bisection point, and conducting an iterative binary search from said starting bisection point to simulate said timing constraint analyses for each simulated sample point.

12. The method of claim 9, said validating each said computed time value (TC) further comprising simulating at each time value of a corresponding reference slew, one of: a right step and a left step, by a step size equal to a corresponding data slew of said TC to yield one of: a passed simulation and a failed simulation, respectively, continuing said simulating until one of: a passed simulation follows a failed simulation, and a failed simulation follows a passed simulation, and for each said TC when a difference between a last simulated value of a last bisection point and a newly simulated value of a new bisection point is less than an exit criterion of a specified error tolerance.

13. A tangible computer program product readable by computer, tangibly embodying a program of instructions executable by said computer to perform a method for determining timing constraint analyses of an integrated circuit (IC), said method comprising:

defining a sequence of sample points for timing constraint analyses in an n×n matrix, each sample point corresponding to a timing arc of said IC that includes a data slew and a reference slew, which is analyzed by one of: simulation and interpolation;

initially simulating corner sample points of said matrix, according to said sequence, by:

substituting minimum and maximum timing constraints from files of said IC, for time values of said data slews;

establishing a step size based on said minimum and maximum timing constraints for a starting bisection point of a binary search;

conducting said binary search from said starting bisection point and using a result from said binary search to simulate said timing constraint analyses for each of said corner sample points; and interpolating other sample points, according to said sequence, each of said other sample points having a starting bisection point that results from linear interpolation of said timing constraint analyses from adjoining sample points, which were simulated.

14. The tangible computer program product of claim 13, said method further comprising:

simulating additional sample points, according to said sequence, at least one boundary for said starting bisection point of said additional sample points being narrowed by one of said timing constraint analyses of said corner sample points;

establishing a step size based on minimum and maximum time values of said data slew of said additional sample point for a starting bisection point; and conducting an iterative binary search from said starting bisection point to simulate said timing constraint analyses for each of said additional sample points.

15. The tangible computer program product of claim 13, said method further comprising:

simulating additional sample points, according to said sequence, at least one boundary for said starting bisection point of said additional sample points being narrowed by said timing constraint analyses for said additional sample points;

establishing a step size based on minimum and maximum time values of said data slew of said additional sample point for a starting bisection point; and conducting an iterative binary search from said starting bisection point to simulate said timing constraint analyses for each of said additional sample points.

16. The tangible computer program product of claim 13, said reference slew of each sample point including a value of pushout, stored in said files.

17. The tangible computer program product of claim 13, said establishing a time value of said step size based on said minimum and maximum timing constraints including one of: a maximum timing constraint, an average of said maximum and minimum timing constraints, and a minimum timing constraint.

18. The tangible computer program product of claim 13, each iterative binary search iteratively simulating a new bisection point between new boundaries to form a new search window, when one of: a passed simulation follows a failed simulation, and a failed simulation follows a passed simulation.

19. The tangible computer program product of claim 18, said iteratively simulating a new bisection point comprising stopping and providing a timing constraint measurement when a difference between a last simulated value of a last bisection point and a newly simulated value of a new bisection point is less than an exit criterion of a specified error tolerance.

20. The tangible computer program product of claim 19, further comprising using a step size defined by an average of said timing constraint analyses from said adjoining sample points for said starting bisection point, iteratively simulating a new bisection point between new boundaries to form a new search window, when one of: a passed simulation follows a failed simulation, and a failed simulation follows a passed simulation, and stopping said iterative simulating when a difference between a last simulated value of a last bisection point and a newly simulated value of a new bisection point is less than an exit criterion of a specified error tolerance.

\* \* \* \* \*